US012157543B2

(12) United States Patent
Moore et al.

(10) Patent No.: US 12,157,543 B2
(45) **Date of Patent: *Dec. 3, 2024**

(54) ADJUSTABLE WATER FLOW DEFLECTION DEVICE FOR A WATERCRAFT AND METHODS OF USE

(71) Applicant: Swell Ventures LLC, White Bear Lake, MN (US)

(72) Inventors: Adam Moore, White Bear Lake, MN (US); Joseph Couture, Lino Lakes, MN (US)

(73) Assignee: Swell Ventures LLC, White Bear Lake, MN (US)

( * ) Notice: Subject to any disclaimer, the term of this patent is extended or adjusted under 35 U.S.C. 154(b) by 619 days.

This patent is subject to a terminal disclaimer.

(21) Appl. No.: 17/412,639

(22) Filed: Aug. 26, 2021

(65) Prior Publication Data

US 2022/0048599 A1 Feb. 17, 2022

Related U.S. Application Data

(63) Continuation of application No. 16/818,776, filed on Mar. 13, 2020, now Pat. No. 11,214,338.

(51) Int. Cl.
*B63B 34/75* (2020.01)
*F15D 1/00* (2006.01)

(52) U.S. Cl.
CPC .............. *B63B 34/75* (2020.02); *F15D 1/005* (2013.01)

(58) Field of Classification Search
CPC ................................ B63B 34/75; F15D 1/005
See application file for complete search history.

(56) References Cited

U.S. PATENT DOCUMENTS

| | | |
|---|---|---|
| 2,127,154 A | 8/1938 | Burk |
| 2,914,019 A | 11/1959 | Miller |

(Continued)

FOREIGN PATENT DOCUMENTS

| | | |
|---|---|---|
| WO | WO2013071148 | 5/2013 |

OTHER PUBLICATIONS

Karbassi, “Vacuum Systems for Successful Robot Implementation”, Oct. 15, 2013, Robotics Tomorrow https://www.roboticstomorrow.com/article/2013/10/vacuum-systems-for-successful-robot-implementation/206.

(Continued)

*Primary Examiner* — Stephen P Avila
(74) *Attorney, Agent, or Firm* — DeWitt LLP

(57) ABSTRACT

A water flow deflection device to enhance a watercraft’s wake. An elongated base with two ends is aligned along the side of the watercraft. The base has a deflector interface with concentrically arranged teeth. A deflector assembly is operably attached to the base between the two ends, with a face that deflects water. The deflector’s leading end is closer to the watercraft than the trailing end. The deflector assembly has a base interface with concentrically arranged teeth. Two or more suction cup assemblies attach to the elongated base to provide removable attachment, with one attached between a first end and the deflector interface and another attached between a second end and the deflector interface. The concentrically arranged teeth of the deflector interface and the base interface operably interlock, allowing rotational adjustment of the deflector relative to the base.

29 Claims, 15 Drawing Sheets

(56) References Cited

U.S. PATENT DOCUMENTS 3,159,134 A 12/1964 Winnen
3,291,094 A 12/1966 Beebe
3,704,679 A 12/1972 Haynes et al.
3,704,976 A 12/1972 Petersen
3,747,138 A 7/1973 Morgan
3,763,812 A 10/1973 Rowe
3,769,927 A 11/1973 Carney
3,918,666 A 11/1975 Florian
3,974,794 A 8/1976 Kakitani et al.
4,043,531 A 8/1977 Green
4,328,761 A 5/1982 Dwyer
4,577,580 A 3/1986 Diffely
4,846,429 A 7/1989 Scheurer et al.
5,070,803 A 12/1991 Smith
5,184,858 A 2/1993 Arai
5,224,436 A 7/1993 Stricker
3,247,820 A 4/1996 White
5,549,071 A 8/1996 Pigeon et al.
5,611,295 A 3/1997 Stables
5,676,085 A 10/1997 Michi
5,715,876 A 2/1998 Burt
5,860,384 A 1/1999 Castillo
5,860,766 A 1/1999 Lochtfeld et al.
5,934,963 A 8/1999 Frizzell
5,975,974 A 11/1999 McCausland
6,006,689 A 12/1999 Olofsson
6,012,408 A 1/2000 Castillo
6,047,657 A 4/2000 Cox
6,105,527 A 8/2000 Lochtefeld et al.
6,154,929 A 12/2000 Dwyer
6,167,830 B1 1/2001 Pilger
6,520,104 B1 2/2003 Svensson
6,523,489 B2 2/2003 Simard et al.
6,606,959 B1 8/2003 Shen
D481,665 S 11/2003 Kinkead
6,712,016 B1 3/2004 Morisch et al.
6,807,920 B1 10/2004 Wynne
6,863,011 B2 3/2005 Kinkead
6,874,441 B2 4/2005 Pigeon
6,941,884 B2 9/2005 Moore
6,991,504 B1 1/2006 English et al.
7,004,097 B2 2/2006 Zeromski
7,063,031 B2 6/2006 Earl et al.
7,140,318 B1 11/2006 Gasper
7,174,843 B1 2/2007 Tossavainen
7,182,037 B2 2/2007 Otobe et al.
7,189,127 B2 3/2007 Otobe et al.
7,201,111 B1 4/2007 Burkett
7,229,059 B1 6/2007 Hood
7,252,047 B1 8/2007 Baucom
7,434,531 B1 10/2008 Zsido et al.
7,475,652 B2 1/2009 Dvorak
7,617,026 B2 11/2009 Gee et al.
7,665,706 B2 2/2010 Chien et al.
7,707,956 B2 5/2010 Moore
8,282,434 B2 10/2012 Kumano
8,336,447 B2 12/2012 Jarisch et al.
8,387,932 B2 3/2013 Takahashi et al.
8,453,591 B2 6/2013 Mannerfelt et al.
8,534,214 B1 9/2013 Gasper
8,539,897 B1 9/2013 Gasper et al.
8,573,873 B2 11/2013 Kalush
8,578,837 B1 11/2013 Burhoe
8,578,873 B2 11/2013 Gasper et al.
8,667,917 B2 3/2014 Brewer
D702,304 S 4/2014 Potter
8,833,286 B1 9/2014 Sheedy et al.
8,851,434 B2 10/2014 Menning et al.
8,967,070 B2 3/2015 Kalil
9,032,897 B2 5/2015 Argo
9,260,161 B2 2/2016 Gasper et al.
9,296,447 B1 3/2016 Morgan et al.
9,334,022 B2 5/2016 Gasper et al.
9,371,115 B2 6/2016 Hammerstrom et al.
9,422,028 B2 8/2016 Wilhelm
9,493,213 B2 11/2016 Thomas
9,540,074 B1 1/2017 Pigeon
9,604,700 B2 3/2017 Naples
9,611,006 B1 4/2017 Miller et al.
9,802,684 B2 10/2017 Sheedy et al.
9,834,280 B1 12/2017 Wilmoth
9,889,909 B2 2/2018 Morgan et al.
9,891,620 B2 2/2018 Green et al.
9,908,596 B2 3/2018 Watson
9,914,509 B1 3/2018 Tegder
9,988,126 B2 6/2018 Wood
10,059,404 B2 8/2018 Clover et al.
10,179,268 B2 1/2019 Fossum
10,183,726 B1 1/2019 McNaughton
10,358,189 B2 7/2019 Sheedy et al.
D860,108 S 9/2019 McNaughton
D864,838 S 10/2019 Clover et al.
D893,395 S 8/2020 Spendlove
11,001,341 B2 5/2021 Spendlove
11,046,393 B2 6/2021 Sheedy et al.
11,214,338 B2 1/2022 Moore et al.
11,225,307 B2 * 1/2022 Moore ...................... B63B 1/32
D953,960 S 6/2022 Moore et al.
11,840,317 B2 * 12/2023 Moore ...................... B63B 1/32
2007/0216154 A1 9/2007 Casagrande
2007/0257167 A1 11/2007 Richter
2008/0190348 A1 8/2008 Baker
2013/0213293 A1 8/2013 Gasper et al.
2013/0228113 A1 9/2013 Gasper et al.
2013/0228114 A1 9/2013 Gasper
2013/0228115 A1 9/2013 Gasper et al.
2014/0137786 A1 5/2014 Gasper et al.
2014/0137787 A1 5/2014 Gasper et al.
2014/0261135 A1 9/2014 Gasper et al.
2015/0175242 A1 6/2015 Sheedy et al.
2016/0009342 A1 1/2016 Thomas
2016/0059934 A1 3/2016 Wilhelm
2016/0340948 A1 11/2016 McCullough
2017/0038771 A1 2/2017 Green et al.
2017/0233038 A1 8/2017 Clover et al.
2019/0210693 A1 7/2019 Spendlove
2020/0385092 A1 12/2020 Eberhardt
2021/0070406 A1 3/2021 Thompson

OTHER PUBLICATIONS

Welcome Aboard-Suction Cleat, pp. 1-2, Nov. 29, 2010, Welcome Aboard Catalog, <http://www.welcome-aboard.com/prodinfo.asp?number=SC1001>, retrieved from Internet Archive Wayback Machine, <http://www.wayback.archive.org/web> on Jun. 13, 2020.
Instagram Social Media Post: "Delta Wakesurfing made simple" Mission Boat Gear, Apr. 28, 2016, 1 page. https://www.instagram.com/p/BEvtcIIFZ4i/?hl=en&taken-by-missionboatgear.
Instagram Social Media Post: "Delta Wakesurfing made simple" Mission Boat Gear, May 5, 2016, 1 page. https://www.instagram.com/p/BFBdm5VFZxS/?hl=en&taken-by=missionboatgear.
Mission LLC, Newsletter: "Delta Wakesurfing made simple." Mission Boat Gear (2016), 4 pages. Printed from https://us12.campaign-archive.com/?u=a9fdbcd03d7fe907c44539a29&id=eeb301246c on Jun. 13, 2020.
Mission LLC, Newsletter: "Meet Delta." Mission Boat Gear (2016), 3 pages. Printed from https://us12.campaign-archive.com/?u=a9fdbcd03d7fe907c44539a29&id=092fa57578 on Jun. 13, 2020.
Mission LLC, Newsletter: "Spring is Here, Mission Delta Wakesurf, A new name for a new era." Mission Boat Gear (2016), 7 pages. Printed from https://us12.campaign-archive.com/?u=a9fdbcd03d7fe907c44539a29&id=ae592f163c on Jun. 13, 2020.
Online Community Forum "DIY Wake Surf Shaper" MasterCraft Team Talk, Oct. 11, 2015 to May 6, 2016, forum pp. 1 to 16, 94 pages. Printed from http://www.mastercraft.com/teamtalk/showthread.php?t=70442 on Jun. 13, 2020.
Product description "Eight.3 Debuts Blade Wakesurf Shaper | Wake Makers," 9 pages. Printed from https://www.wakemakers.com/eight3-blade-wakesurf-shaper.html on Jun. 13, 2020.

(56) References Cited

OTHER PUBLICATIONS

Product description "Eight.3 Ronix Blade 138 Wakesurf Shaper, Newest Suction Cup Device," 5 pages. Printed from https://www.wakemakers.com/resources/eight3-blade-wakesurf-shaper-debut/ on Jun. 13, 2020.
Product description "Wakesurf Shaper the 138 Concave Blade | Ronix," 3 pages. Printed from https://www.ronixwake.com/Product/wakesurf-shaper-the-138-concave-blade/ on Jun. 14, 2020/.
Planetnautique Forum, Aug. 16, 2016, printed from https://www.planetnautique.com/vb5/forum/nautique-topics/general-nautique-discussion/497351-swell-wakesurf-creator as accessed on May 28, 2020.
Planetnautique Forum, Aug. 28, 2016, printed from https://www.planetnautique.com/vb5/forum/nautique-topics/maintenance-technical-discussion/diy-articles/470350-hull-side-surf-wedge-diy/page2 as accessed at Oct. 31, 2018.
Photograph of Device dated Sep. 5, 2015.
Forum—Moomba Boats © 2022 vBulletin Solutions Inc. https://forum.moomba.com/showthread.php?27467-Anyone-seen-or-tried-Ronix-Wakesurf-Shaper-on-Moomba-boats/page7 (Post dated May 7, 2016).
QuickShift Wake Shaper, https://www.quickshiftwakesurfing.com/429095804/product/2263205/quick-shift-wake-shaper?catid=796170 retrieved on (2016) pp. 1-2.
SC 1001 Suction Cleat, ProStock Marine, Retrieved online from Internet Wayback Archive Machine, https://web.archive.org/web/20160428160727/http://www.prostockmarine.com/index.php?id_product=72&controller=product, dated Apr. 28, 2016.
Accessories Overview: Maintenance Packs, NautiBuoy Marine, retrieved online from Internet Wayback Archive Machine https://web.archive.Org/web/2017060412513 1/http://nautibuoymarine.com/accessories-overview/maintenance-pack/ dated Jun. 4, 2017.
Vacuum Lifters—Below-The-Hook Lifters, retrieved online from Internet Wayback Archive Machine, https://web.archive.org/web/20170316134423/https://www.wpg.com/catalog/below-the-hook-lifters dated Mar. 16, 2017.
Vertical Lifters, retrieved online from Internet Wayback Archive Machine, https://web.archive.org/web/20170316164448/http://www.wpg.com:80/catalog/below-the-hook-lifters/vertical-lifters dated Mar. 16, 2017.
Vacuum Mounting Cups, retrieved online from Internet Wayback Archive Machine, https://web.archive.org/web/20170316134559/http://www.wpg.com:80/catalog/vacuum-mounting-cups dated Mar. 16, 2017.
"AKUA Bass Boat Fender", © 2011-2015 by Akuka Boat Fenders.
Vacuum Mount Cleats, Yacht Innovations, retrieved online from Internet Wayback Archive Machine, https://web.archive.org/web/20170515041410/http://vacuumcleat.yachtinnovations.com:80/ dated May 15, 2017.
U.S. Appl. No. 15/467,954, Third-Party Submission Under 37 CFR 1.290 and Concise Explanation of Relevance filed Sep. 13, 2017.
U.S. Appl. No. 15/467,954, Third-Party Submission Under 37 CFR 1.290 and Concise Explanation of Relevance filed Dec. 17, 2017.
Application and File History for Design U.S. Appl. No. 29/624,039, now Design U.S. Pat. No. D. 860,108, inventor McNaughton, filed Oct. 30, 2017.
Swell Wakesurf, retrieved online from Internet Wayback Archive Machine, https://web.archive.org/web/20170724073524/https://www.swellwake.com dated Jun. 24, 2017. 4 pages.
Wakesurf Shaper, Ronixwake, retrieved online from Internet Wayback Archive Machine, https://web.archive.org/web/20170331023700/http://www.ronixwake.com:80/Product/wakesurf-shaper dated Mar. 31, 2017.
Delta Wake Shaper, Mission LLC, retrieved online from Internet Wayback Archive Machine, https://web.archive.org/web/20161126085129/http://www.missionboatgear.com:80/collections/delta-wakesurf-panel dated Nov. 2016 (17 pages).
Application and File History for U.S. Appl. No. 16/818,776, filed Mar. 13, 2020, inventors Moore et al.
Application and File History for U.S. Appl. No. 16/818,824, filed Mar. 13, 220, inventors Moore et al.

* cited by examiner

ADJUSTABLE WATER FLOW DEFLECTION DEVICE FOR A WATERCRAFT AND METHODS OF USE

RELATED APPLICATION

This application is a continuation of application Ser. No. 16/818,776, filed Mar. 13, 2020, which is hereby fully incorporated herein by reference.

TECHNICAL FIELD

The present invention relates generally to watercraft accessories, in particular wake shaping enhancement of a watercraft by a water flow deflection device, and even more in particular an adjustable water flow deflection device that can enhance the formation of a desirable wake behind a watercraft.

BACKGROUND

Wake surfing, a water sport in which a rider performs surfing maneuvers on a surfboard in the wake of a boat without being directly pulled by the boat, has risen dramatically in popularity over the last several decades. Wake surfing largely emerged as an offshoot of wakeboarding, and likewise made use of conventional water ski boats, despite the relatively flat wake which is ideal for skiing being ill-suited to surfing. In response, highly specialized sports boat designs have since emerged with features including inboard propellers and elaborate ballast systems to maximize the boat's wake for surfing.

These specialized surfboats may incorporate a deflector, often positioned near the stern of the vessel, to shape the vessels wake. However, such specialized boats have their deflectors limited to a secured position (parallel to the hull) and a deployed position (perpendicular to the hull). Adjustment of the deflector's position in the water is accomplished by ballast adjustment of the entire vessel.

Further, surfboats are rarely suitable for other uses and are cost prohibitive for a large portion of the consumer market. However, conventional water ski boats are designed to minimize waves, such that the generation of a wake behind a conventional water ski boat is not ideal without specialized equipment.

Thus, there is a need for adapting a variety watercrafts for wake surfing. There is also a need for aftermarket adaptability of a variety of watercrafts for wake surfing. There is a further need for adjustability in aftermarket devices to provide maximum wake with minimal modifications of a watercraft. There is a further need to maximize the hydrodynamics of such aftermarket devices.

SUMMARY

Disclosed herein are embodiments of a water flow deflection device for enhancing wake formation behind a watercraft. In some aspects, the water flow deflection device is configured to be attachable to a side of a watercraft, in some preferable aspects the hull of a watercraft. In some aspects, the water flow deflection device is an integral accessory on one or more sides of the hull of a watercraft.

In some aspects, the water flow deflection device has an adjustable deflector, such that the deflector is capable of being adjusted in a vertical manner with respect to oncoming water to enhance the water flow deflection as the watercraft moves through the water and thereby enhancement of wake formation behind the watercraft. The deflector may be adjusted automatically or manually to provide desired wake shaping behind a watercraft. In some aspects, such as in attachable and removeable aftermarket devices, the deflector is manually adjusted to a desired deflector position, such that the deflector obtains a desirable vertical position with respect to the oncoming water upon the watercraft reaching the desired speed moving through the water. In some other preferred aspects, such as in an integral accessory on one or both sides of the hull of the watercraft, the deflector is configured to automatically adjust to a desirable vertical position with respect to the oncoming water while the watercraft is moving through the water.

In some aspects, the desirable vertical position of the deflector is such that the face of the deflector is configured to be approximately perpendicular to the flow of the oncoming water during normal operational use. In some aspects, the desirable vertical position of the deflector is such that the face of the deflector is configured to be approximately perpendicular to the water surface during normal operational use. In some aspects, the deflection face of the water deflection device is rotatable in a vertical direction relative to the hull of the watercraft, allowing for rapid and convenient adjustment of the contact angle between the deflector face and the oncoming water in response to changes in the crafts ballast, the weather or water conditions, the surfer's preference, or other conditions.

In some aspects, a water flow deflection device is configured to be attached to a side of a watercraft for the enhancement of a watercraft wake, and comprises an elongated base, a deflector assembly, and two or more suction cup assemblies. The elongated base has a first end and a second end and is configured to be aligned along the side of the watercraft when the water flow deflection device is attached to the watercraft. The elongated base has a deflector interface having a first plurality of concentrically arranged teeth. The deflector assembly is operably attached to the base between the first and second ends of the elongated base and comprises a deflector face spanning between a leading end and an opposing end. The leading end extends outwardly from the elongated base at an acute angle. The deflector face has a surface area configured to deflect water, with the leading end being in closer proximity to the watercraft than the trailing end when the water flow device is attached to the watercraft. The deflector assembly has a base interface having a second plurality of concentrically arranged teeth. The two or more suction cup assemblies attach to the elongated base, with a first suction cup is attached to the elongated base between the first end and the deflector interface and a second suction cup is attached to the elongated base between the second end and the deflector interface. Together the first and second suction cups are configured to provide removable attachment of the elongated base to the watercraft. The first plurality of concentrically arranged teeth of the deflector interface and the second plurality of concentrically arranged teeth of the base interface are configured to operably interlock with each other, and the first and second plurality of concentrically arranged teeth are configured to allow a rotational adjustment of the deflector relative to the elongated base.

The rotational adjustment of the deflector relative to the elongated base may be between about 0° to about 30° in either direction. The rotational adjustment of the deflector relative to the elongated base may provide a total range of rotational motion of about 60°. The rotational adjustment of the deflector relative to the elongated base may be between about 0° to about 22.50° in either direction. The rotational adjustment of the deflector relative to the elongated base may provide a total range of rotational motion of about 45°.

The first and second plurality of concentrically arranged teeth may be between about 40 teeth and about 120 teeth, such that the rotational adjustment of the deflector per tooth is between about 3° and about 9°. The deflector assembly may have one or more rotational alignment guidance indicia proximately located the base interface. The elongated base may have one or more rotational alignment guidance indicia proximately located the deflector interface.

The deflector face may have a textured surface comprising a plurality of geometrically shaped concave indentations.

The deflector assembly may have a base deflector operably attached to an extendible deflector that is capable of slidably adjust the surface area of the deflector face of the deflector assembly. The extendible deflector may overlay at least a portion of the base deflector and is capable of being slidably adjusted relative to the base deflector between a retracted position, fully extended position and one or more intermediate extended positions.

In some aspects, the invention is directed to water flow deflection device configured to be attached to a side of a watercraft for the enhancement of a watercraft wake. The water flow deflection device comprises an elongated base, a deflector assembly, and two or more suction cup assemblies. The elongated base has a first end and a second end and is configured to be aligned along the side of the watercraft when the water flow deflection device is attached to the watercraft. The deflector assembly is operably attached to the base between the first and second ends and comprises a deflector face spanning between a leading end and an opposing end. The leading end extends outwardly from the elongated base at an acute angle. The deflector face has a surface area configured to deflect water, with the leading end being in closer proximity to the watercraft than the trailing end when the water flow device is attached to the watercraft. The deflector face has a textured surface comprising a plurality of geometrically shaped concave indentations. The two or more suction cup assemblies are attached to the elongated base, with a first suction cup being attached to the elongated base between the first end and the deflector assembly and a second suction cup being attached to the elongated base between the second end and the deflector assembly. Together the first and second suction cups are configured to provide removable attachment of the elongated base to the watercraft.

The plurality of geometrically shaped concave indentations may have a hexagonal shape. The plurality of geometrically shaped concave indentations may each be approximately the same size and shape.

The elongated base may have a deflector interface with a first plurality of concentrically arranged teeth configured to operably interlock with a second plurality of concentrically arranged teeth proximately located on a base interface of the deflector assembly. The first and second plurality of concentrically arranged teeth may be configured to allow a rotational adjustment of the deflector relative to the elongated base. The rotational adjustment of the deflector relative to the elongated base may be between about 0° to about 30° in either direction providing a total range of rotational motion of about 60°.

The deflector assembly may comprise a base deflector operably attached to an extendible deflector, wherein the extendible deflector is capable of being slidably extended relative to the base deflector to adjust the surface area of the deflector face of the deflector assembly. The extendible deflector may overlay at least a portion of the base deflector and may be capable of being slidably adjusted relative to the base deflector between a retracted position, with a fully extended position and one or more intermediate extended positions. Both the base deflector and the extendible deflector may have the textured surface comprising the plurality of geometrically shaped concave indentations.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
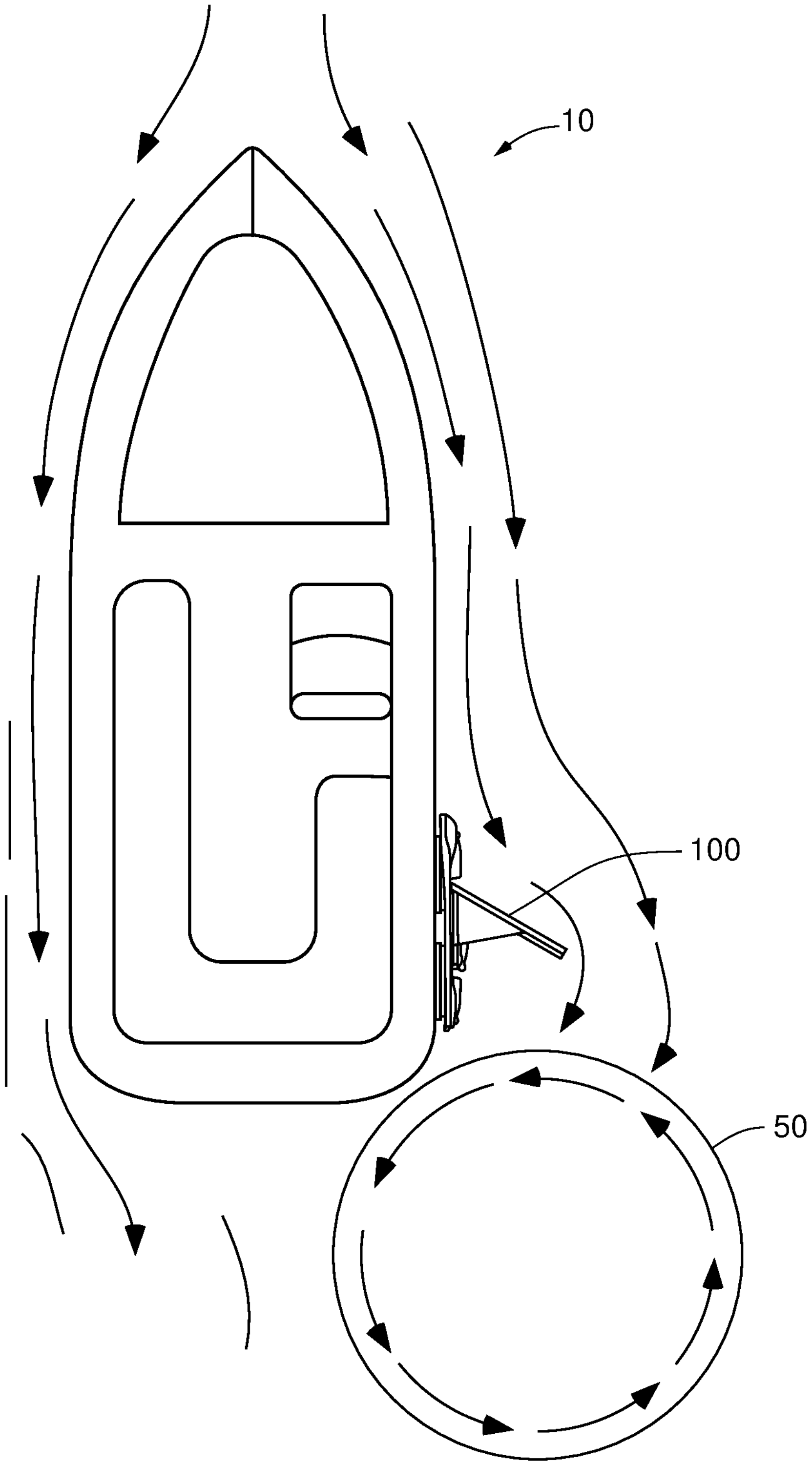
FIG. 1 is a top perspective view of a water flow deflection device attached to the side of a watercraft, according to certain embodiments of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Described herein is a water flow deflection device for altering a watercraft's wake, such that the water flow deflection device is capable of enhancing the watercraft's wake to improve its surfable characteristics. By adjusting the angle of the deflector of the water flow deflection device to the oncoming water, different wake sizes and characteristics may be achieved. Surfers of different size and skill levels may desire wakes of different sizes and characteristics. By improving the ease of adjustability of a water flow deflection device, the present disclosure provides for wider applicability of the water flow deflection device to different skill levels of users and watercrafts. By enabling the deflector of the water flow deflection device to adjust in a vertical configuration with respect to the oncoming water, the user has greater control over the contact angle between the water flow deflection device and the oncoming water and proper positioning of the water flow deflection device for ideal wake conditions is more easily achieved. Also, by enabling the user to control the surface area of the deflector, a water flow deflection device is usable for a wider array of boat sizes and powers. Changes in deflector surface area also enables a single water flow deflection device to create wakes with a wider array of features, thus producing wake characteristics suitable for surfers of various sizes, skill and abilities.

Referring now generally to the figures, FIG. 1 illustrates a water flow deflection device 100 attached to a side of a watercraft 10. While FIG. 1 illustrates an attachable water flow deflection device 100, the following disclosure is equally applicable to a water flow deflection device 300 that is integral with the hull or a watercraft 10, such as discussed further with respect to FIGS. 9A-9C.

As the watercraft 10 moves through the water, the water flow deflection device 100 redirects the flow of water outward and away from the side 20 of the watercraft 10 as shown in FIG. 1. As one of ordinary skill in art will understand and appreciate, a vacuum is created in the water as the watercraft 10 moves forward through the water. This vacuum draws the flow of water back behind the watercraft 10 colliding with the flow of water from the opposing side of the boat 10 and creating a wake 50 behind the watercraft 10. By redirecting the water away from the side of the watercraft 10, the water flow deflection device 100 alters the angle at which this redirected flow of water is drawn back behind the watercraft 10, which pushes up or enhances the flow of water from the opposing side of the watercraft 10 when the two flows merge back together behind the watercraft 10. Without wishing to be bound by theory, the formation of the wake behind the watercraft 10 is not only dependent upon the speed of the watercraft 10 moving through the water, but also the surface area of the water flow deflection device 100 interacting with the water. The deflector of the wave flow deflection device 100, 300 of the present invention is adjustable in a vertical direction with respect to the oncoming water, such that a desired angle of interaction between the water flow deflection device 100 and the flow of the oncoming water can be obtained at any desirable speed of the watercraft 100.

Figure 2A:
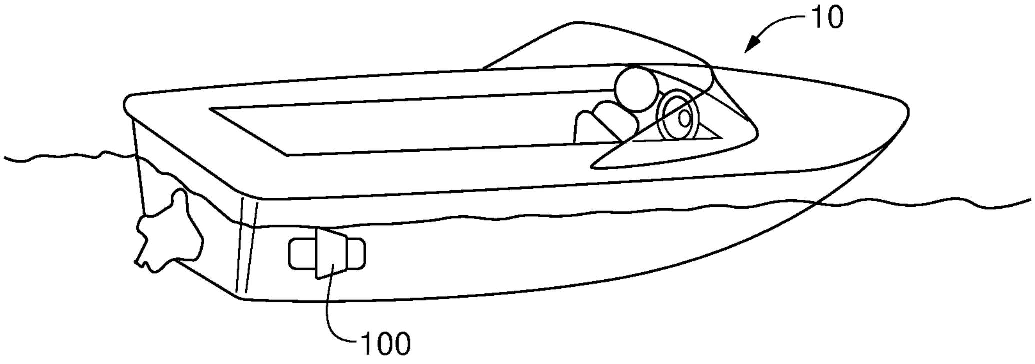
FIG. 2A is a side perspective view of the water flow deflection device of FIG. 1 attached to the side of the watercraft with the deflector set at a normal position and the watercraft at a stationary position not moving through the water, according to certain embodiments of the present invention.
Figure 2B:
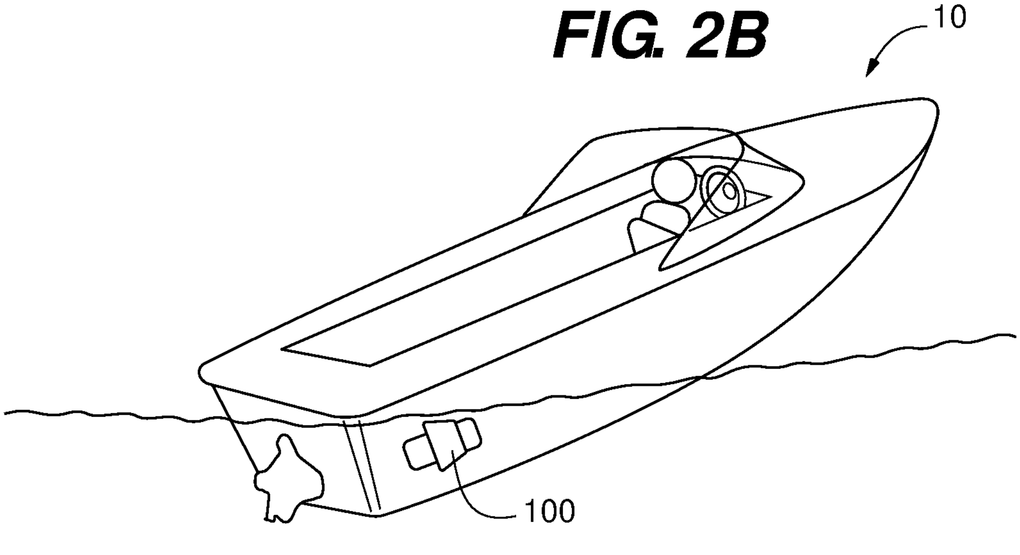
FIG. 2B is a side perspective view of the water flow deflection device of FIG. 1 attached to the side of the watercraft with the deflector set at a normal position and the watercraft moving through the water at a normal water surfing speed, according to certain embodiments of the present invention.

For instance, FIG. 2A shows a water flow deflection device 100 proximate the side of a watercraft 10 while in a stationary position, whereby the water flow deflection device 100 is substantially perpendicular to the water surface. As the watercraft 10 begins to move through the water, the water flow deflection device 100 continues to be in a substantially perpendicular to the water surface and oncoming water. However, when the watercraft 10 accelerates and gets to a faster speed, the bow of a watercraft 10 typically lifts out of the water with a pronounced tilt or angle from the bow to the aft. This pronounced tilt or angle of the watercraft also affects the angle of interaction between the water flow deflection device 100 and the flow of oncoming water. As shown in FIG. 2B, the water flow deflection device 100 has an angle of interaction that is no longer substantially perpendicular to the water surface or oncoming water.

Figure 2C:
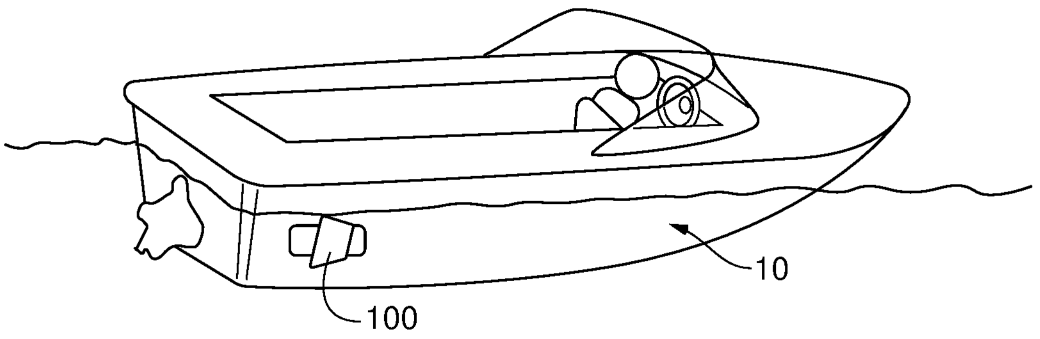
FIG. 2C is a side perspective view of the water flow deflection device of FIG. 1 attached to the side of the watercraft with the deflector rotatably adjusted and the watercraft at a stationary position not moving through the water, according to certain embodiments of the present invention.
Figure 2D:
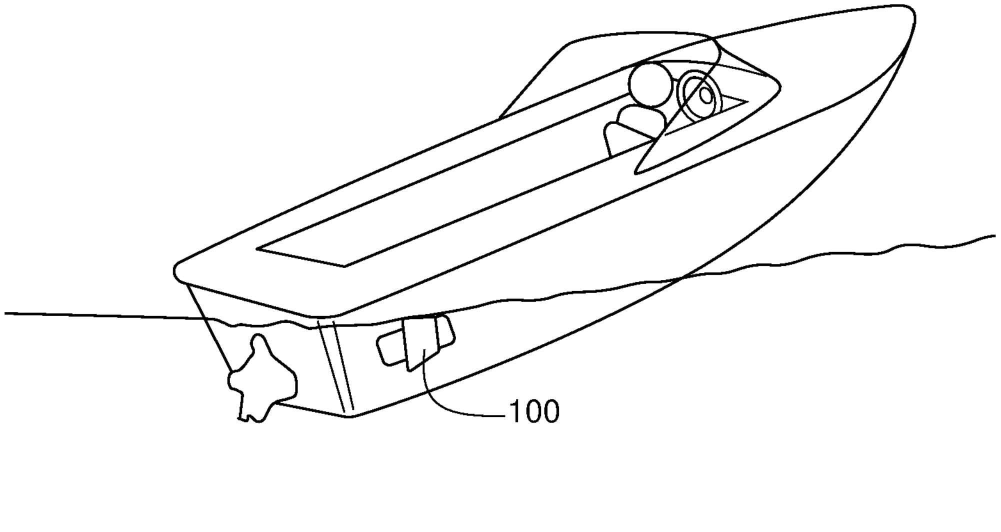
FIG. 2D is a side perspective view of the water flow deflection device of FIG. 1 attached to the side of the watercraft with the deflector rotatably adjusted and the watercraft moving through the water at a normal water surfing speed, according to certain embodiments of the present invention.

The water flow deflection device 100 of the present invention is able to address this altered angle of interaction between the water flow deflection device 100 and the oncoming water by providing a deflector 120 that is capable of being adjustably rotated to provide a desired angle of interaction between the water flow deflection device 100 and the oncoming flow of water. As shown in FIG. 2C, the deflector 120 of the water flow deflection device 100 is rotated away from the water surface and towards the floor of the body of water, such that when the watercraft 10 is moving through the water at a desired speed with the pronounced tilt or angle from the bow to the aft, the water flow deflection device 100 is now substantially perpendicular to the water surface and the oncoming flow of water, as shown in FIG. 2D.

Referring now generally to FIGS. 3-7, the water flow deflection device 100 that is removably attachable to the side of a watercraft and capable of rotatably adjusting the deflector 120 is described. The water flow deflection device 100 generally includes a base plate 110 operably connected to a deflector 120 at an acute angle, preferably between about 30° and about 60°, more preferably between about 40° and about 45°, and the base plate 110 having one or more suction plates 140 for attachment of the water flow deflection device 100 to a watercraft 10.

Base plate 110 has a proximal end 111 and a distal end 113, wherein the proximal end 111 is configured to be located towards the bow of the watercraft 10 and the distal end is configured to be located towards the stern of the watercraft 10 when the water flow deflection device is removably attached to the hull of a watercraft 10. Base plate 110 has a deflector interface 112 located between the proximal 111 and distal 113 ends, wherein deflector interface 112 permits both rotation and secure engagement with deflector 120.

Base plate 110 may further include one or more apertures 114 that allow for suction plates 140 and deflector 120 to be secured to base plate 110. In some preferred aspects, as best shown in FIGS. 2-4, base plate 110 has at least one aperture 114*a* located between the proximal end 111 and deflector interface 112, and at least one aperture 114*b* located between the distal end 113 and deflector interface 112, wherein such apertures 114 allow at least two suction plates 140 to be attached to base plate 110. Base plate 110 also preferably has at least one aperture 114*c* located proximate the center of deflector interface 112, wherein such aperture 114*c* allows deflector 120 to be attached to base plate 110. Aperture 114*c* also allows for the rotatable adjustment of deflector 120 with respect to base plate 110.

In some aspects, proximal end 111 of base plate 110 has a rear edge contour. In some aspects, distal end 113 of base plate 110 has a 117 front edge contour 115. Front edge contour 115 and rear edge contour 117 may be provided as raised surfaces on the base plate 110 and serve to improve the hydrodynamics of the wave flow deflection device 100. In some aspects, front edge contour 115 has a semi-circular, oval, single chine, multi-chine or rounded-vee configuration. In some aspects, as shown best in FIG. 4, at least a portion of the front edge contour 115 is raised relative to base plate 110, such as front edge protrusion portion 115*a*. Front edge protrusion portion 115*a* may have a protruding height that provides for optimizing hydrodynamic water flow over the plate lock 142 during normal operational use. In some aspects, rear edge contour 117 has a semi-circular, oval, single chine, multi-chine, rounded vee, box or rounded box configuration. In some aspects, as shown best in FIG. 4, at least a portion of rear edge counter 117 is raised relative to base plate 110, such as opposing fin protrusion sections 117*a*, 117*b*.

Base plate 110 may also have one or more tether attachment apertures 119, which allows for securing base plate 110 to watercraft 10 using a connection device such as a lanyard, rope or other connector, such that the water flow deflection device 100 is capable of being secured to the watercraft 10 when suction plates 140 are in an unengaged position. The one or more tether attachment apertures 119 may be located at the proximal end 111 or distal end 113 of base plate 110. In some aspects, as shown in FIG. 4, tether attachment apertures 119 are located proximate the proximal end 111 between opposing fin sections 117*a*, 117*b*, such that interaction between the connection device and oncoming water flow to produce the wake is minimized during normal use.

Deflector interface 112 may provide for secure attachment of a deflector 120 to the base plate 110 by operably engaging deflector interface 112 of the base plate 110 with the base plate interface 122 of the deflector 120. Interface lock 150 may be locked to secure deflector 120 to base plate 110 in the desired position or released to allow rotatable adjustment of deflector 120.

As shown in FIGS. 4-6B, deflector interface 112 of base plate 110 has a plurality of concentrically configured teeth 118, which are capable of operably engaging with a corresponding plurality of concentrically configured teeth 126 of the base plate interface 122 of the deflector 120. Specifically, the plurality of concentrically configured teeth 118 are capable of operably interlocking with the plurality of concentrically configured teeth 126, as each of the concentrically configured teeth 118, 126 have triangular shaped peaks with valleys between each peak, such that the peaks of teeth 118 operably engage with the valleys of teeth 126 and the peaks of teeth 126 operably engage with the valleys of teeth 118. The operable interlocking of the plurality of concentrically configured teeth 118, 126 allows secure attachment of deflector 120 to base plate 110 at the desired rotational location and preventing deflector 120 from inadvertently rotating during normal operational use.

The plurality of concentrically arranged teeth 118, 126 also allow deflector 120 to be rotatably adjusted with respect to base plate 110 in one or more different planes. For example, the plurality of concentrically arranged teeth 118, 126 may be operably unlocked from each other to allow deflector 120 to be rotatably adjusted, such that deflector face 124 can be adjusted to one of a plurality of angled directions relative to the base plate 110.

Figure 3A:
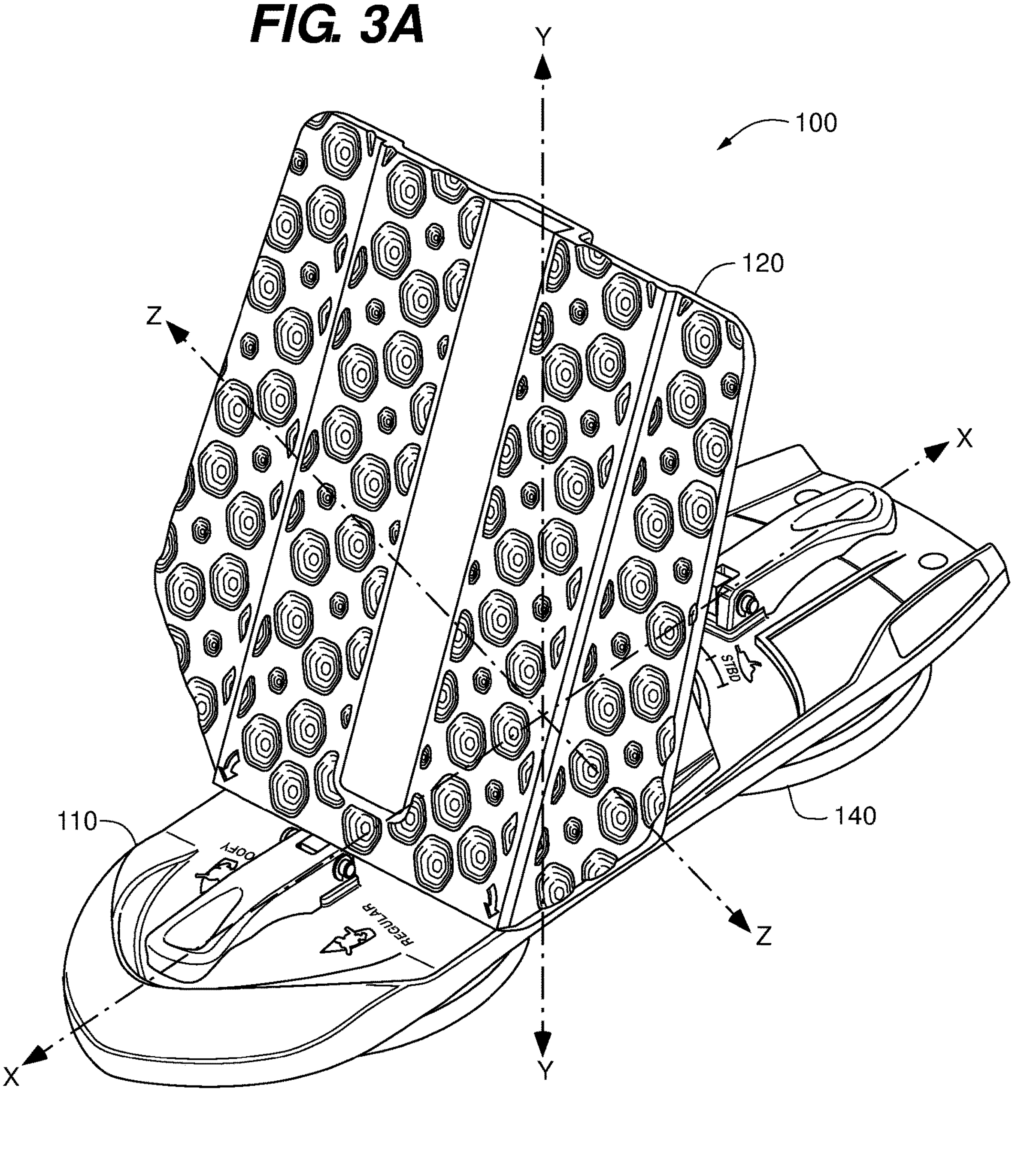
FIG. 3A is a top, front side perspective view of a water flow deflection device, according to certain embodiments of the present invention.
Figure 3B:
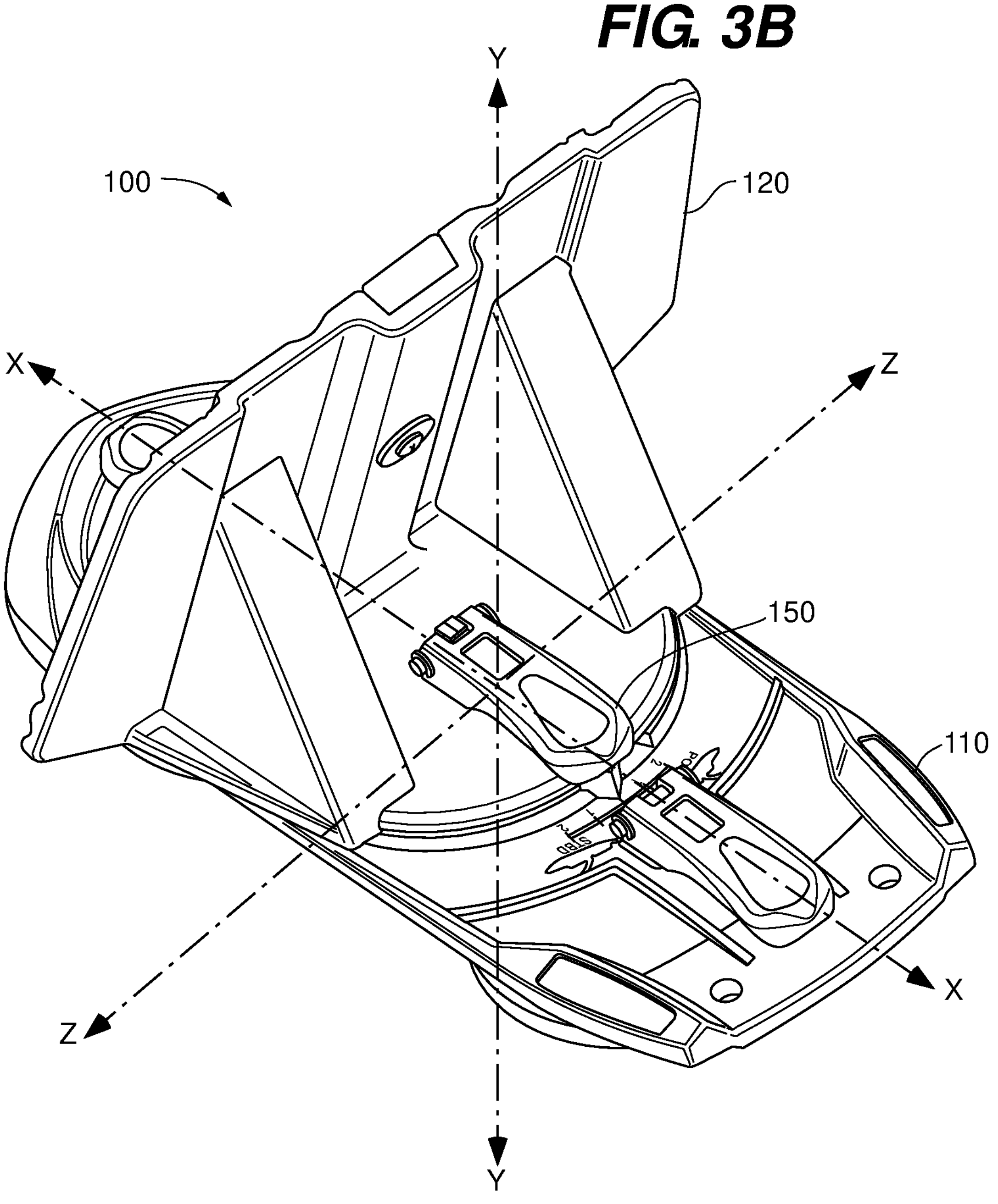
FIG. 3B is top, rear side perspective view of the wave flow deflection device of FIG. 1, according to certain embodiments of the present invention.
Figure 4:
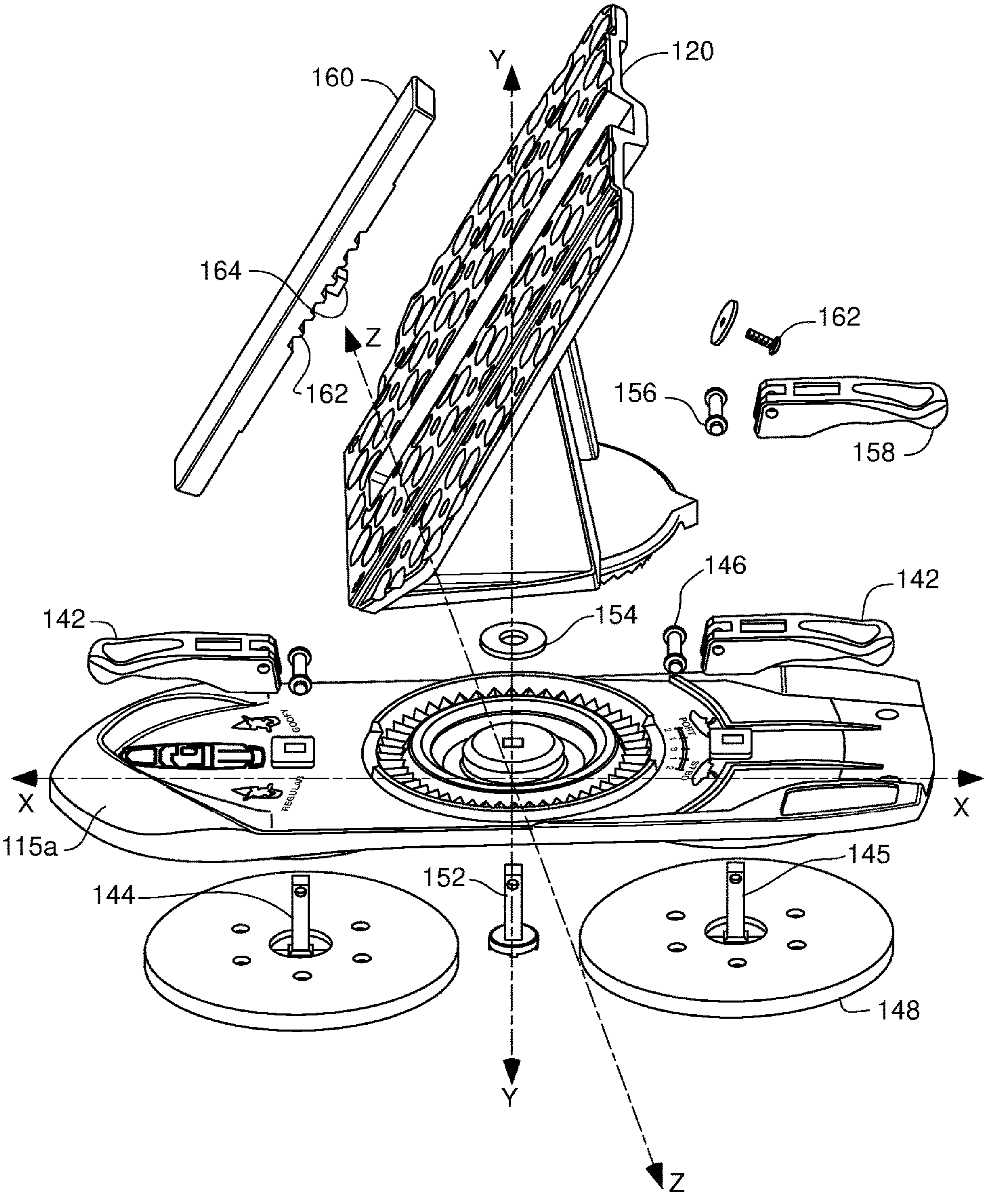
FIG. 4 is a side perspective exploded view of the water flow deflection device of FIG. 1, according to certain embodiments of the present invention.
Figure 5:
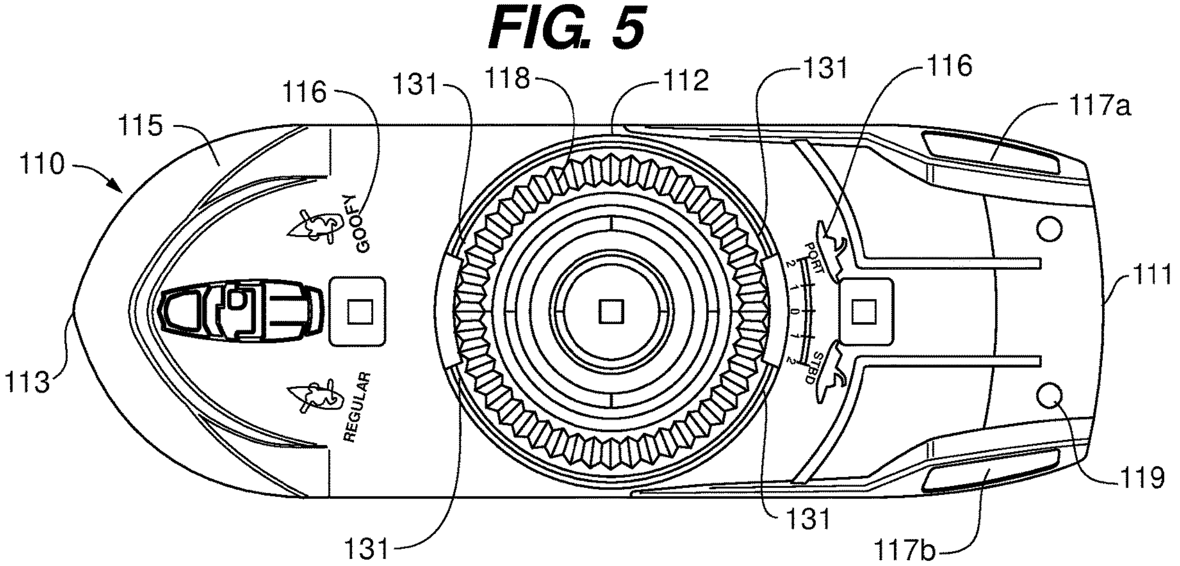
FIG. 5 is top view of a base plate for a water flow deflection device, according to certain embodiments of the present invention.

In some aspects with respect to the rotatable adjustment of deflector 120, base plate 110 defines an X-axis running from the distal end 113 to the proximal end 111 through aperture 114*c*, such that each side of the X-axis is substantially a mirror image of each other, as illustrated in FIGS. 3A-3B. The Y-axis can be defined by a line that passes through pivot aperture 128 of the deflector 120 and aperture 114*c* located proximately the center of deflector interface 112 of base plate 110, such that Y-axis is perpendicular to X-axis. Deflector 120 is rotatable about the Y-axis, such that the angle of the deflector face 124 is capable of being rotatably changed upon such rotation of deflector 120. As discussed above, the plurality of concentrically arranged teeth 118, 126 can be operably interlocked to secure deflector 120 to base plate 110 upon the desired rotation of angle of deflector face 124 having been achieved.

In some aspects, deflector 120 is capable of being rotated to offset the tilt or angle of the watercraft 10 moving through the water during normal operation. In certain aspects, deflector 120 has a normal unrotated position, such that the side edges of the deflector face 124 are substantially parallel to the side edges of base plate 110, which is illustrated in FIGS. 3A-3B. In some aspects, the normal unrotated position is defined by the top edge of the deflector face 124 being substantially perpendicular to the side edges of base plate 110. In still some other aspects, the normal unrated position is defined by the deflector 120 being positioned such that the deflector face 124 substantially forms a mirror image of itself with respect to a plane running down the middle of the base plate 110 from the distal end 113 to the proximal end 111, which is as shown by the X-axis in FIGS. 3A-3B.

The plurality of concentrically arranged teeth 118 on base plate 110 may interlock with coordinating teeth 126 on deflector 120 to provide secure attachment for the deflector 120. The plurality of concentrically configured teeth 118, 126 may be configured to permit rotation of deflector 120 in either a clockwise or counterclockwise direction. In some other aspects, the plurality of concentrically configured teeth 118, 126 may be configured to only permit rotation in either the clockwise or counterclockwise direction. In some aspects, plurality of concentrically configured teeth 118, 126 are rotatable by a ratcheting mechanism until the desired deflection angle of deflector 120 is achieved.

In some aspects, deflector 120 is capable of being rotated from 0° to about 30° in either direction about the Y-axis, such that there is a total range of rotational motion of up to about 60°, in some aspect greater than 0° to about 25° in either direction about the Y-axis, such that there is a total range of rotational motion up to about 50°, in some aspects greater than 0° to about 20° in either direction about the Y-axis, such that there is a total range of rotational motion up to about 40°, in some more preferable aspects greater than 0° to about 15° in either direction about the Y-axis, such that there is a total range of rotational motion up to about 30°, from about 1° to about 15° in either direction, and in some aspect from about 3° to about 15° in either direction.

In some aspects, each of the plurality of concentrically arranged teeth 118, 126 of base plate 110 and deflector 120 are capable of rotating the deflector 120 between about 1° and about 15°. For instance, in the situation of each of the plurality of concentrically arranged base plate teeth 118 and deflector teeth 126 having 360 teeth (peaks and valleys), each rotational turn to an adjacent tooth (moving the peak to operably engage with the next adjacent valley) rotates the deflector about 1°, about 2° for each rotational turn about 180 teeth, about 3° for each rotational turn about 120 teeth, about 4° for each rotational turn about 90 teeth, about 5° for each rotational turn about 72 teeth, about 6° for each rotational turn about 60 teeth, about 7.5° for each rotational turn about 48 teeth, about 8° for each rotational turn about 45 teeth, about 9° for each rotational turn about 40 teeth, about 10° for each rotational turn about 36 teeth, about 12° for each rotational turn about 30 teeth, and about 15° for each rotational turn about 15 teeth.

In some preferred aspects, each of the plurality of concentrically arranged teeth of the base plate 118 and corresponding deflector 126 are capable of rotating the deflector 120 between about 4° and about 9°, such that there are between about 40 and about 90 concentrically arranged teeth, more preferably about 5° and about 8°, such that there are between about 45 and about 72 concentrically arranged teeth, most preferably about 7.5°, such that there is about 48 concentrically arranged teeth (48 peaks and 48 valleys) on each of the deflector interface 112 and base plate interface 122, wherein the plurality of concentrically arranged teeth 118, 126 are capable of operably interlocking with each other.

In some aspects, suction plates 140 are operably attached to base plate 110. Suction plates 140 may be configured with a fastener post 144, wherein a separate fastener post 144 passes through each respective aperture 114*a*, 114*b* and may be secured with a lock lever 142. Apertures 114*a*, 114*b* may be sized and shaped to closely align with the size and shape of the fastener post 144. While base plate 110 is depicted with two aperatures 114*a*, 114*b*, it is contemplated that three or more apertures 114 may be utilized to accommodate three or more suction plates 140, or different types of attachments. Suction plates 140 are capable of being attached to watercraft 10 by positioning such plates 140 on watercraft 10 and positioning lock lever 142 from an unattached position to an attached position. Plate locks 142 may be simple lever latches which may be locked to seal suction plates 140 to the hull of a watercraft 10 or released to remove or adjust the water flow deflection device 100.

In some aspects, apertures 114 may be absent, such as in embodiments where base plate 110 is integral with the hull of a watercraft 10. In such embodiments, means of attaching base plate 110 to a hull surface may therefore be unnecessary, as a portion of the hull may comprise base plate 110. In other aspects, suction plates 140 or other means of affixing the base plate 110 may be integral to the base plate 110, such that apertures 114 or equivalent features may therefore be unnecessary to attach the suction plates 140 to the base plate 110. For example, the base plate 110 may attached to a hull using adhesive, or suction plates, hook and loop fasteners, or other attachment means may be attached to or form part of base plate 110.

Tether attachment points 119 on base plate 110 are depicted as apertures in base plate 110 through which a tether may be threaded to attach base plate 110 or the entire water flow deflection device 100 to an attachment point, e.g., a buoy or a cleat on a dock or watercraft. In certain embodiments, tether attachment points 119 may take any form which permits securing of base plate 110, such as a hook, arch, loop, etc. In certain embodiments, there may be one, two, three or more tether attachment points 119, or in some other aspects, tether attachment points 116 may be absent. In some other aspects, one or more tether attachment points 119 may be provided on deflector 120.

Base plate 110 may be further configured with various alignment guidance features 116 for indicating to a user the rotational adjustment when the water flow deflection device 100 is attached to the port or star side of the watercraft 10. The alignment guidance features 116 may be located on base plate 110 between the deflector 120 and the distal end 113 and/or between the deflector 120 and the proximal end 111. Alignment guidance features 116 can indicate to a user the rotational adjustment of deflector 120 to base plate 110 when the water flow deflection device is used for a water surfer having regular foot positioning or goofy foot positioning.

Deflector interface 112 not only provides deflector 120 with a secure attachment point to base plate 110, but also the necessary rotational freedom to permit vertical adjustment by a user of the angle between the deflector face 124 and the oncoming water flow or surface of the water. Deflector interface 112 may generally be integrally molded with the body of base plate 110, including integral features such as the plurality of concentrically arranged teeth 118. Teeth 118 and aperture 114*c* may be formed by molding, pressing, machining, or any other integral or reductive method of formation. Such methods may generally be preferred to provide a unitary base plate 110 body, however in embodiments a more piecemeal construction may be desired, e.g., for ease of parts replacement, and additive methods of formation may instead by used. For example, concentrically arranged teeth 118 may be separate components and customizable by a user to be specific to achieve a desired configuration of the water flow deflection device.

Other features of base plate 110, such as apertures 114*a*, 114*b*, front and rear contours 115, 117, and tether attachment features 119 may also be integrally formed with base plate 110, such as by molding, pressing, or machining. Alignment guidance features 116 may be integral or applied as an additional component. They may be etched, pressed, painted, applied as decals, or the like.

Aperture 114*c* centrally located in deflector interface 112 provides a passage in the base plate 110 for pin 152 to pass through and secure deflector 120 to base plate 110. In certain embodiments, aperture 114*c* in deflector interface 112 may be sized and shaped to securely hold a pin or post with tight clearances. In certain embodiments, aperture 114*c* may be sized and shaped to permit a pin or post to rotate within aperture 114*c*. In other aspects, aperture 114*c* may be sized and shaped to prevent a pin or post from rotating within aperture 114*c*, but instead, the pin or post may rotate within pivot channel 128 of deflector 120.

Alignment guidance features 116 provide a user assistance in orienting the water flow deflection device 100 on the hull of a watercraft 10. Alignment guidance features 116 may indicate which direction to orient the distal and proximal ends 113, 111 of the water flow deflection device 100 towards in relation to the watercraft 10 for a surfer's preferred orientation (left foot, regular, or right food, "goofy," forward). Alignment guidance features 116 may also indicate which direction to rotationally adjust deflector 120 in relation to the bow of the watercraft depending upon whether the water flow deflection device 100 is mounted on the port or starboard side of the watercraft 10. Alignment guidance features 116 may also have rotational adjustment indicia pertaining to where deflector 120 is at an unrotated position and also one or more rotational positions. In certain aspects, the alignment guidance features 116 will provide an unrotated position and two or more rotational positions in each direction from the unrotated position. In certain aspects, deflector 120 has an alignment guidance feature 125 that operably aligns with a corresponding alignment feature 116 on base plate 110 to indicate to a user whether the deflector 120 is at an unrotated position or one of the two or more rotational positions.

In certain embodiments, alignment guidance features 116, 125 may appear as pictures, symbols (such as arrow, notches or the like), written words, or any other appropriate indicia means of indicating proper alignment to a user. In certain embodiments with rotationally adjustable deflector 120, additional alignment guidance features 116, 125 may mark particular settings of the deflector 120 to assist a user in successful quick mounting and alignment of the water flow deflection device 100 following an initial determination of the proper orientation and setting for a particular watercraft 10.

The deflector interface 112 of base plate 110 may further incorporate a raised outer ring 131. In embodiments, raised outer ring 131 may only partially circumscribe deflector interface 112, such that alignment feature 125 of deflector 120 interacts with raised outer ring 131 to limit the rotation of deflector 120.

In aftermarket embodiments, suction plates 140 secure water flow deflection device 100 to a hull of watercraft 10 when plate locks 142 are in the locked position. When plate locks 142 are in the open position, suction plate 140 will release from the watercraft hull and allow for adjustment of the arrangement of the base plate 110 on the watercraft's hull. The suction plates 140 allow for fast and efficient installation of the water flow deflection device 100 and adjustment of the base plate 110 placement and angle on the hull of watercraft 10. Easy adjustment of base plate 110 on the hull of watercraft 10 provides for one means of adjustment of water depth placement and contact angle of deflector 120-to maximize the surfable wake, as well as changing sides, e.g., for a goofy footed rider. Vertical placement and adjustment of base plate 110 on the hull of a watercraft 10 may enable the water flow deflection device 100 to be set at water level when the watercraft 10 is at surfing speed, and adjusted according to different ballast levels of a watercraft 10 (e.g., changes in the number of passengers) and different surfer's preferred wake surfing speed. Horizontal placement and adjustment of base plate 110 on the hull of a watercraft 10 between the bow and stern may enable the user to achieve the ideal distance from the stern of the watercraft 10 to produce the maximum surfable wake. If deflector 120 is non-adjustably fixed to base plate 110, then adjustment of base plate 110 angle on the hull of watercraft 10 may also enable deflector 120 to properly contact the water's surface to produce a desired surfable wake.

In certain embodiments, deflector 120 may be configured to rotate vertically and thus adjust the angle of contact with the oncoming water, making achievement of the ideal angle and production of the desired surfable wake easier. Rotational adjustment of deflector 120 with the flow of oncoming water for water flow deflection device 100 attached to the hull of watercraft 10 permits faster, easier adjustments to get the desired deflector angle and wake characteristic than detaching the water flow deflection device 100 from the watercraft 10 and repositioning at a desirable horizontal and vertical location on the hull. Rotational adjustment of deflector 120 also enables quick adjustment for a variety of changes to watercraft 10, including weight, weight distribution, speed, desired wake size and shape, and the like.

Suction plates 140 may comprise rubber overmolds 148 operably engaged with an overmold plate 144 located on the bottom of base plate 110. Overmold plate 144 may comprise a base to which rubber overmold 148 operably attaches, such as a flat disc, and have a central post 145 emerging perpendicularly from overmold plate 144 that operably engages through aperture 114*a* or 114*b* and attaches to suction plate lock lever 142 located on the top of base plate 110 via clevis pin 146. Each of lock levers 142 are configured to engage suction plates 140 when depressed (pressed parallel to base plate 110) by drawing up overmold plate 144 and creating a concave shape in rubber overmold 148, thus forming a suction. Such plates 140 are configured to release the suction by lifting lock lever 142 and operably pushing overmold plate 144 away from base plate 110.

Interface lock 150 provides for secure attachment of deflector 120 to base plate 110. Interface lock 150 may also permit release of deflector 120 from base plate 110, such as for rotatable adjustment deflector 120 relative to base plate 110. Interface lock 150 may provide for secure engagement of base plate interface 122 with a corresponding deflector interface 112 in the base plate 110. Interface lock 150 comprises deflector pin 152, which secures deflector 120 to the base plate 110 by deflector pin 152 passing from the bottom side of base plate 110 through aperture 114*c* in base plate 110 and pivot channel 128 of deflector 120 to the top side of base plate interface 122. Deflector pin 152 may be secured to lock lever 158 on the top side of base plate interface 122 with clevis pin 156 in similar manner as that of suction plates 140. In certain aspects, a washer 154, which may be added at the distal end of deflector pin 152, is flat and configured to distribute the applied tension when lock lever 158 is operably engaged to a locked position securing deflector 120 to base plate 110 at the desired position.

Figure 6A:
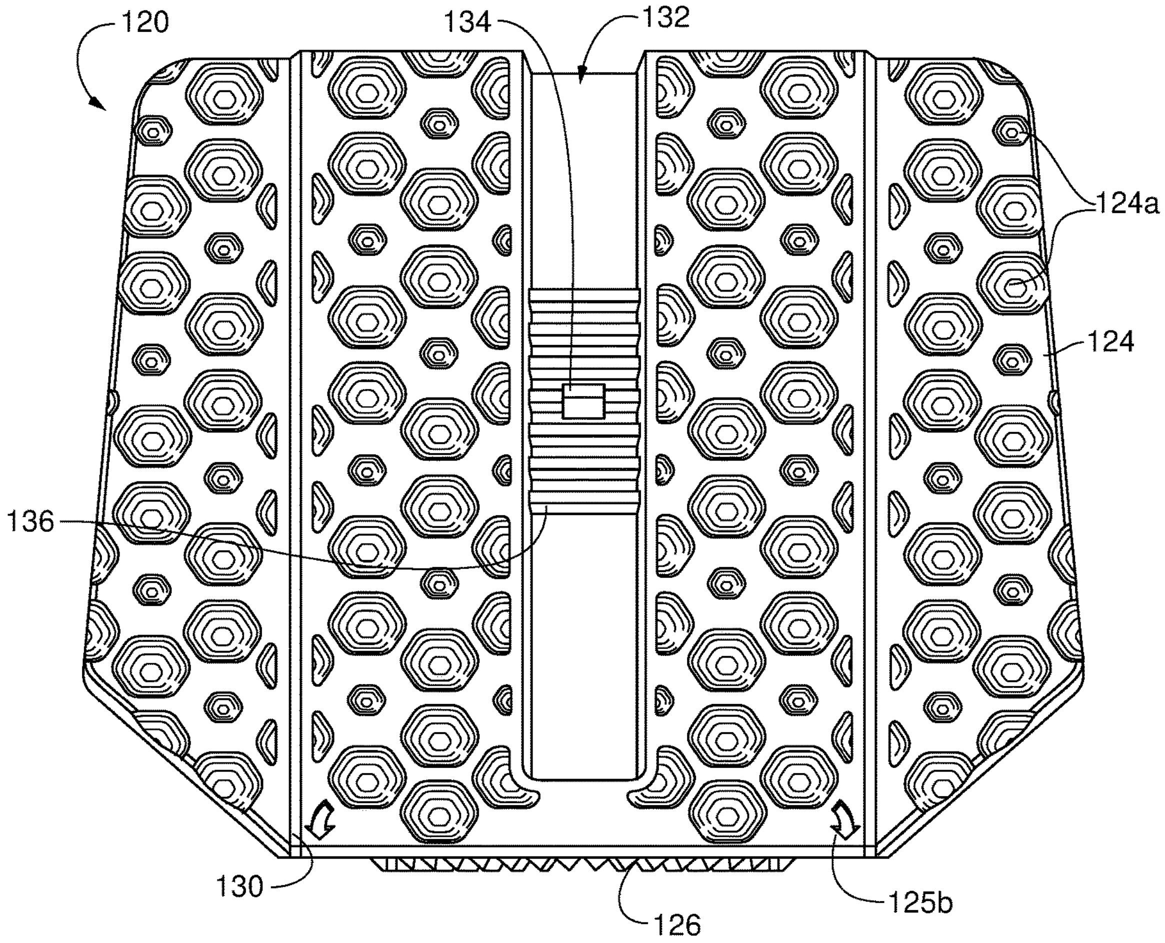
FIG. 6A is a front plan view of a deflector of the water flow deflection device, according to certain embodiments of the present invention.
Figure 6B:
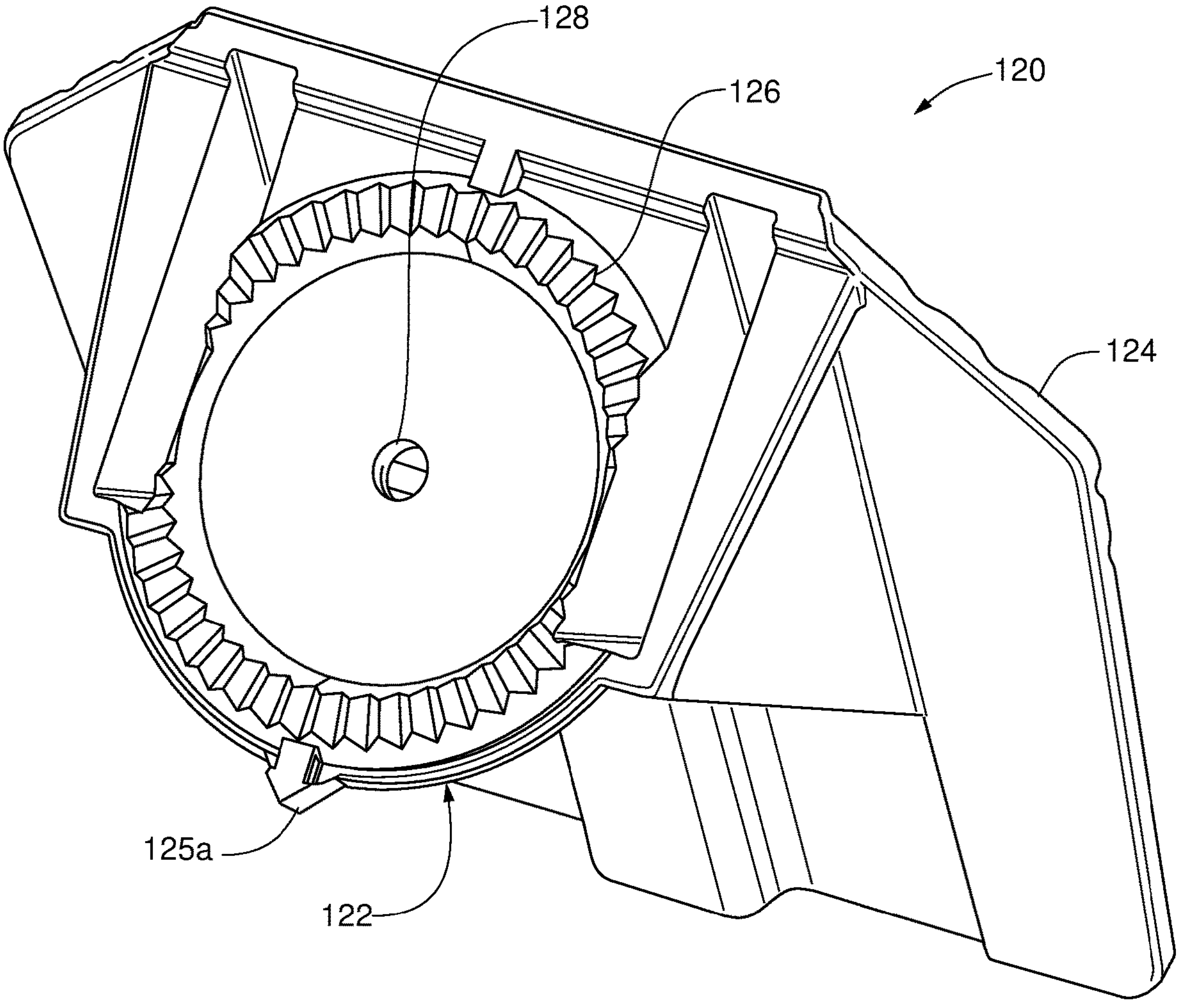
FIG. 6B is a bottom perspective view of the deflector of FIG. 6A, according to certain embodiments of the present invention.

Referring now to FIGS. 3A and 6A, deflector 120 comprises deflector face 124 having a textured surface, which may allow the flow of oncoming water to flow quicker off the deflector face 124 as the watercraft 10 moves through the water. In certain aspects, the textured surface of deflector face 124 comprises a plurality of concave dimples 124*a*. Dimples 124*a* may comprise a variety of shapes and sizes. In some aspects, dimples 124*a* are generally hexagonally shaped. In some aspects, dimples 124*a* comprise two or more different sized generally hexagonally shaped concave dimples.

In some aspects, at least 10% of deflector face 124 comprises a concave textured surface, in some aspects at least 15%, in some aspects at least 25%, and in some aspects at least 30%. In some aspects, between about 10% and about 95% of the surface area of deflector face 124 comprises a concave textured surface, in some aspects between about 15% and about 85%, in some aspects between about 20% and about 75%, and in some aspects between about 25% and about 65%. In some aspects, the concave textured surface has a surface area that is greater than the flat surface of deflector face 124.

In some aspects, deflector face 124 comprises one or more alignment guidance feature **125*b*. The one or more alignment guidance feature 125*b* may be formed or molded as part of deflector face 124 or later machined, carved, painted, or otherwise applied to deflector face 124. Alignment guidance features 125*b* may correspond with an associated base plate alignment guidance feature 116 located between deflector 120 and proximal end 111 of base plate 110 to assist a user in achieving the desired rotational alignment of deflector 120. Desired rotational alignment of deflector 120 may depend on a rider's skill, a rider's preference for regular or goofy, weather conditions, boat size, engine size, current or target ballast for skiing, and the like. In some aspects, alignment guidance features 125*b* in conjunction with corresponding alignment guidance feature 116 indicate to a user which direction to rotationally adjust deflector 120** depending upon whether the user's preference is regular or goofy foot for surfing.

Deflector 120 may also have one or more alignment guidance feature **125*a* located on the proximal side of deflector 120 to operably engage with one or more alignment features 116 located between deflector 120 and proximal end 111 of base plate 110. Alignment guidance feature 125*a* may provide a user with an indication of the rotation of deflector 120 relative to base plate 110 and assist in achieving a desired rotational angle. In certain embodiments, one or more coordinating alignment guidance features 116 or raised outer rim 131 may be provided on base plate 110, with which alignment guidance feature 125*a* may align to assist the user in identifying when deflector 120 is appropriately rotationally positioned. Raised outer rim 131 may be configured to only circumscribe a portion of deflector interface 112, such that rim 131 may interfere with alignment feature 125*b* such that the engagement between deflector interface 112 and base plate interface 122** outside of desired angles is prevented.

It may generally be preferable for deflector 120 to be aligned at a slight downward angle relative to the hull of the watercraft 10 when the watercraft 10 is at rest, as shown in FIG. 2C, such that when the watercraft 10 is brought up to speed deflector 120 is substantially perpendicular to the flow of oncoming water. The one or more alignment guidance features 125 on deflector 120 may be particularly configured to achieve such a downward angle with respect to one or more alignment guidance features 116 on base plate 110. Alignment guidance features 116, 125 may provide a range of indications, such that the precise desired angle for a wide variety of watercraft sizes, powers, and rider preferences may be covered by the provided indications.

In some aspects, deflector face 124 may be provided in substantially the same plane. In some other aspects, as shown best in FIGS. 3A, 3B, 4 and 6A, deflector face 124 may have a central portion that is in a different plane than the outer portions. Deflector face 124 may comprise one or more guide ridges 130 that provide a transition between the plane of the central portion and the plane of the outer portions. Guide ridges 130 may also correspond with alignment guidance features 116 on base plate 110. The central portion of deflector face 124 may have a central channel 132 with a centrally located aperture 134 and a plurality of teeth 136 (peaks and valleys). The central channel 132 being capable of receiving an inset cover 160. In some aspects, inset cover 160 is about the same thickness as central channel 132, such that when received within central channel 132 inset cover 160 is substantially in the same plane as the central portion of deflector face 124. Inset cover 160 may have a plurality of teeth 162 that operably interlock with the plurality of teeth 136 of the central channel 132. Inset cover 160 may also have a securing aperture 164, such that a fastener such as a screw may be operably inserted through centrally located aperture 134 on the backside of deflector 120 to secure inset cover 160 to deflector 120 within central channel 132.

Figure 7:
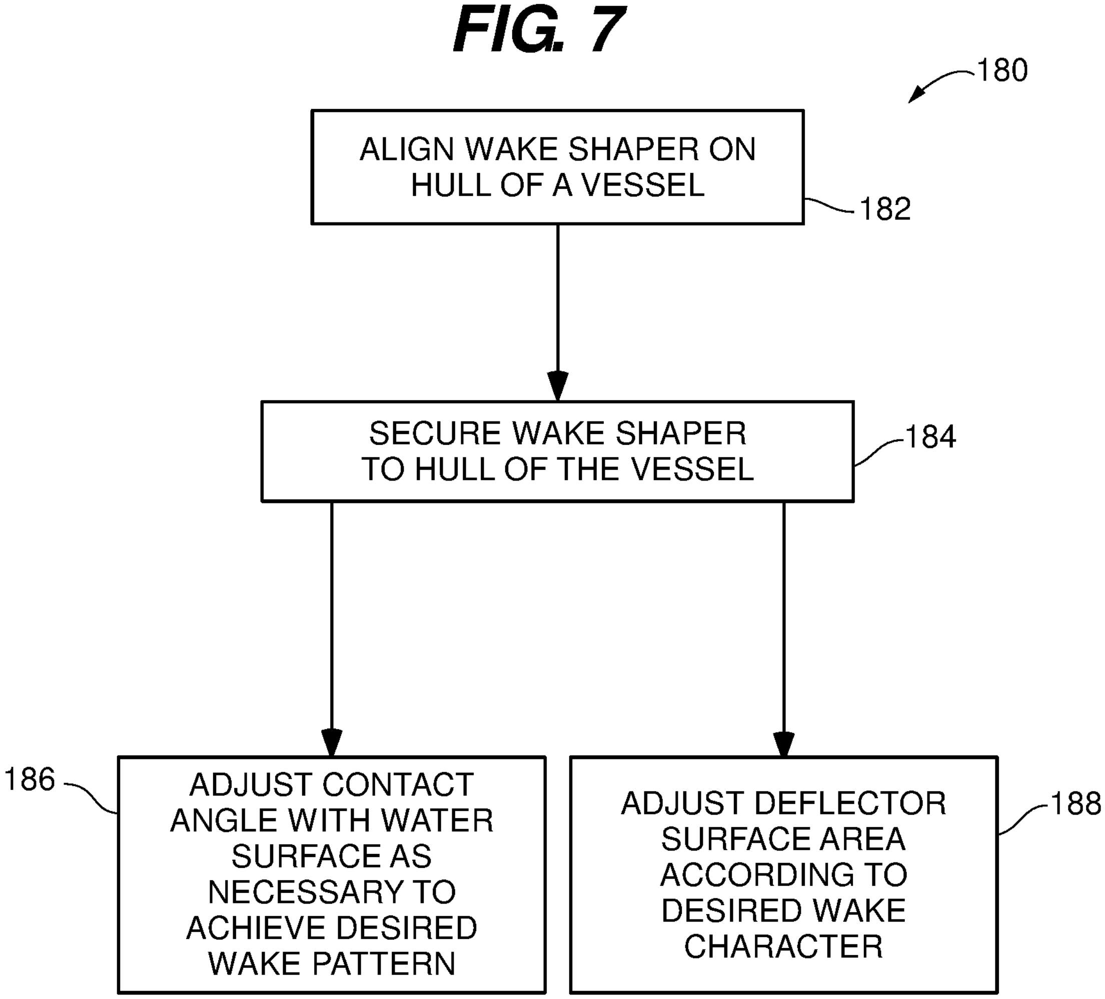
FIG. 7 is a flowchart of method for using an adjustable water flow deflection device that is attachable and removeable from a watercraft, according to certain embodiments of the present disclosure.
Figure 8A:
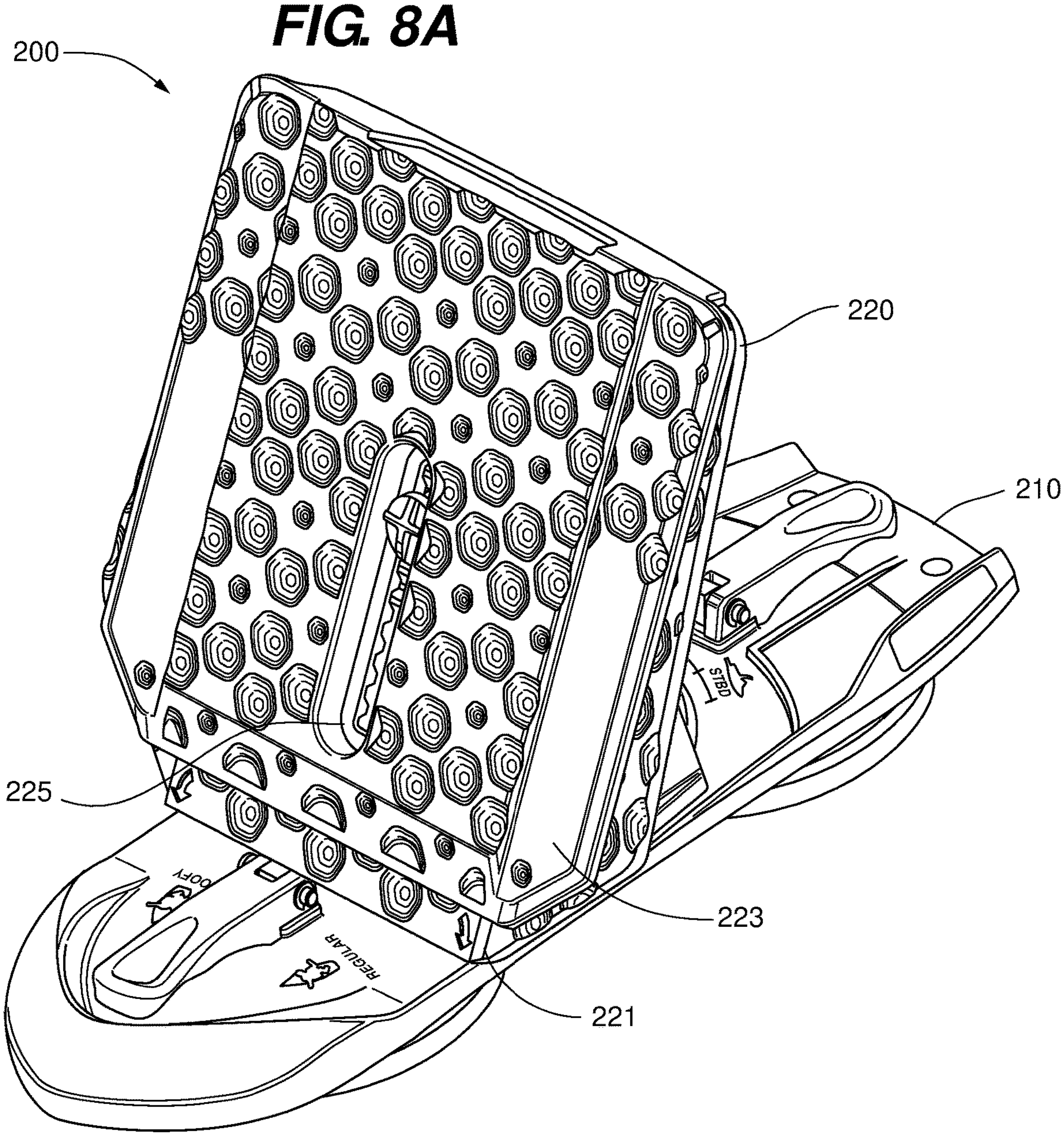
FIG. 8A is a front side perspective view of a deflector of the water flow deflection device, according to certain embodiments of the present invention.
Figure 8B:
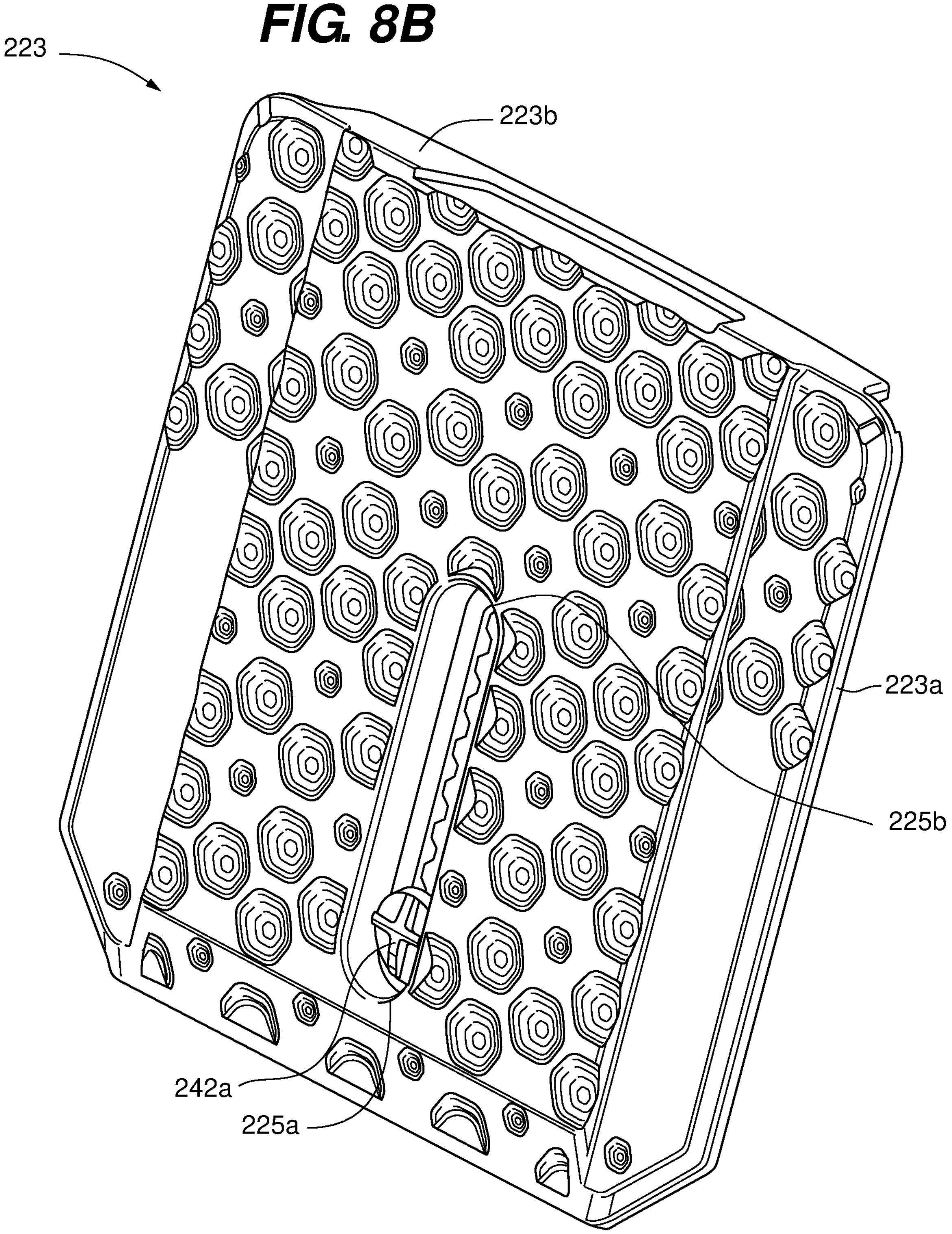
FIG. 8B is a front side perspective view of the deflector of FIG. 8A, according to certain embodiments of the present invention.
Figure 8C:
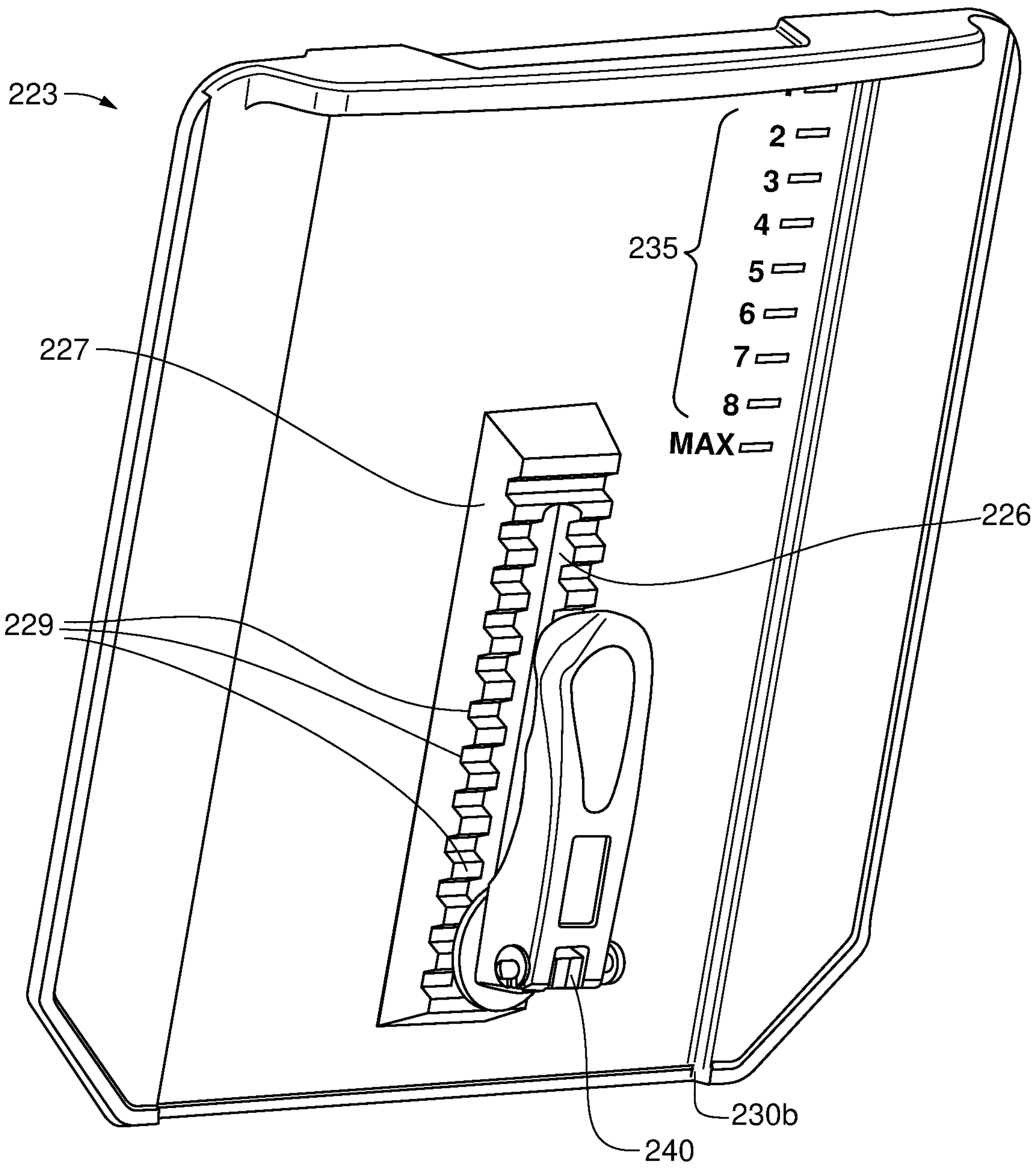
FIG. 8C is a rear side perspective view of the deflector of FIG. 8A, according to certain embodiments of the present invention.
Figure 8D:
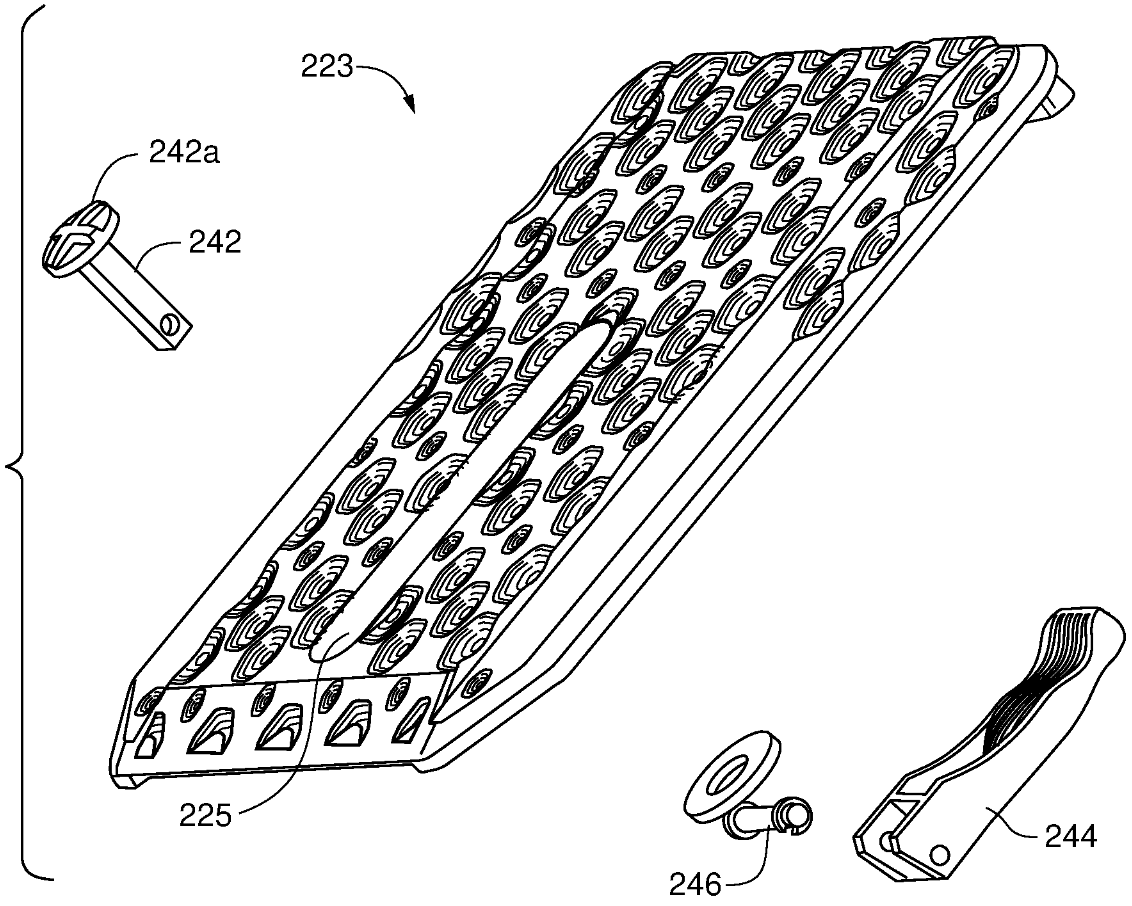
FIG. 8D is an exploded view of the deflector of FIGS. 8A-8C, according to certain embodiments of the present invention.

FIG. 7 provides a flowchart of an example method 180 of using water flow deflection device 100, according to embodiments of the present disclosure. In some aspects, a user of the water flow deflection device 100 may generally begin by aligning 182 the water flow deflection device 100 on one side of the hull of a watercraft 10. In some aspects, the water flow deflection device 100 may be mounted as near the stern of the watercraft 10 as possible, on a fully submerged flat and smooth surface. In certain aspects, the water flow deflection device 100 has optimal performance when mounted about 3 to about 4 inches below the water line and as near the back of the hull as possible. Once located in the desired vertical and horizontal locations of the watercraft 10, the water flow deflection device 100 is then secured to the hull 184 by operably engaging the suction plates 140. In certain embodiments, the water flow deflection device 100 is secured to the hull by pressing the device firmly against the hull and locking the suction plate levers 142 into the securing position. The locked position of the suction levers 142 may be achieved when the levers are substantially parallel to the base plate and the hull.

The rotational angle of deflector 120 may be rotationally adjusted before and/or after water flow deflection device 100 is secured to the hull of watercraft 186. In some aspects, the rotational angle of deflector 120 is adjusted after water flow deflection device 100 is secured to the hull of watercraft 10. In some other aspects, rotational angle of deflector 120 is adjusted before water flow deflection device 100 is secured to the hull of watercraft 10. In either instance, interface lock 150 is operably disengaged to allow rotational adjustment of deflector 120. Interface lock 150 is operably engaged once deflector 120 is engaged in the desired rotational angle.

Adjusting deflector surface area 188 is discussed in more detail below in reference to example embodiment 200 in FIGS. 8A-8D.

Referring now generally to FIGS. 8A-8D, another embodiment of a water flow deflection device 200 of the present invention is illustrated. The water flow deflection device 200 illustrated in FIGS. 8A-8D has an adjustably extendible deflector assembly 220 operably coupled to base plate 210. The adjustably extendible deflector assembly 220 generally comprises a base deflector 221 and an overlaying extension deflector 223. Extension deflector 223 overlays base deflector 221 and is slidably adjustable from a retracted position to a fully extended position with one or more intermediate extended positions between the retracted position and the fully extended position. Extension deflector 223 has a centrally located channel 225 with a centrally located channel aperture 226, and base deflector 221 has a centrally located aperture 234 (base deflector 221 may generally be substantially similar to deflector 120 of FIGS. 3A-6B, and aperture 234 may be substantially equivalent to aperture 134 in FIG. 6A), wherein aperture 234 and channel 225 with channel aperture 226 operably engage with securing assembly 240 for securing extension deflector 223 with base deflector 221 at the desired position, whether the retracted position, one or more intermediate extended positions, or the fully extended position.

Securing assembly 240 comprises pin 242 that transverses through channel 225 and aperture 222 and connects with locking lever 244 via clevis pin 246. Locking lever 244 can be in an unlocked position that allows the slidable adjustability of extension deflector 223 or a locked position that prevents the slidable adjustability of extension deflector 223. Locking lever 244 in the unlocked position allows extension deflector 223 to slidably adjust by extending away from base plate 210 or retracting towards base plate 210 by allowing pin 242 to slide within channel 225. In certain aspects, the head 242*a* of pin 242 located on deflector face side of extension deflector 223 fits within channel 225 and is larger than aperture 234, such that pin 242 allows for the slidable adjustability of extension deflector 223. Once extension deflector 223 is provided at the desired position, locking lever 244 can be operably engaged to a locked position, which prevents any further slidable adjustment of extension deflector 223 during normal operational use. In some aspects, the unlocked position of locking lever 244 is achieved by pulling locking lever 244 away from the backside of base deflector 221 and relieving the tension pressure. In some aspects, the locked position of locking lever 244 is achieved by pushing locking lever 244 towards the backside of base deflector 221 to operably engage the tension pressure. In some aspects, the locked position of locking lever 244 is achieved by locking lever 244 being in a substantially parallel configuration to base deflector 221 and extension deflector 223, while the unlocked position of locking lever 244 is achieved by locking lever 244 being in a substantially perpendicular configuration to base deflector 221 and extension deflector 223.

In some aspects, extension deflector 223 may have a top edge 223*b* that is substantially perpendicular to the extension deflector face 223*a*. Top edge 223*b* allows an operable engagement point for a user to pull or push on extension deflector 223 until the desired extended or retracted position is reached. In the retracted position, top edge 223*b* may operably engage with the top edge of base plate 210.

In some aspects, the range of extension is limited by the length of channel 225. In the retracted position, head 242*a* of pin 242 operably engages with a proximal end 225*a* of channel 225. In the fully extended position, head 242*a* of pin 242 operably engaged with a distal end 225*b* of channel 225. In the one or more intermediate extended positions, head 242*a* of pin 242 is located between the proximal and distal ends 225*a*, 225*b* of channel 225.

In some aspects, extension deflector 223 may comprise one or more extension indicia 235 located on the backside of extension deflector 223. In some aspects, the one or more extension indicia 235 operably interact with the top edge of base deflector 221 to indicate to the user the retracted or extended position of extension deflector 223. In some preferred aspects, extension deflector 223 comprises a plurality of extension indicia 235 located on the backside that align with the top edge of base deflector 221 to indicate to a user whether the extension deflector 223 is in the retracted position, fully extended position or one or more intermediate extended positions. In some aspects, the plurality of extension indicia 235 contain numerals and/or markings for ease of extension adjustability to a desired setting.

In some aspects, the width of extension deflector 223 is substantially the same width of base deflector 221, such that the width of the deflector assembly 220 is about the same whether the extension deflector 223 is in the retracted position, fully extended position or one or more of the intermediate extended positions.

In some aspects, base deflector 221 has deflector face 224 (substantially similar to face 124 of FIG. 6A), which has the same contoured configuration as deflector face 124 discussed above with respect FIGS. 3A, 3B, 4 and 6A. Deflector face 224 may have a central portion that is in a different plane than the outer portions. Deflector face 224 may comprise one or more guide ridges 230*a* (substantially similar to guide ridges 120 of FIG. 6A) that provide a transition between the plane of the central portion and the plane of the outer portions. Guide ridges 230*a* operably interact with guide ridges 230*b* located on the backside of extension deflector 223, which helps provide the extension deflector 223 in a slidable track configuration with respect to base deflector 221 and prevent extension deflector 223 from sliding in a direction other than towards and away from base plate 221, such as to prevent sliding in a transverse direction. Guide ridges 230*a* may also correspond with alignment guidance features on base plate 210.

The central portion of deflector face 224 may have at least one central channel 232 with a centrally located aperture 234 and a plurality of teeth 236 (peaks and valleys) (substantially similar to central channel 132, aperture 134, and teeth 136 of FIG. 6A). In some aspects, central channel 232 is proximately located the center of deflector face 224. Central channel 232 is capable of receiving a protruding portion 227 of extension deflector 223. Protruding portion 227 may have a plurality of teeth 229 that operably interlock with the plurality of teeth 236 of the central channel 232. The interlocking plurality of teeth 236, 229 may help prevent extension deflector 223 from slidably extending during normal use.

In some aspects, central channel 232 extends from a bottom portion of deflector face 224 to an upper portion. In some aspects, central channel 232 extends the entire distance from a bottom portion to the top edge of base deflector 221, such as deflector 120 shown in FIG. 6A. Central channel 232 extending the entire distance from a bottom portion to the top edge of deflector face 224 allows a portion of protruding portion 227 to operably engage with the top edge in the fully extended position and one or more of the intermediate extended positions.

As illustrated in FIGS. 8A-8D, centrally located channel aperture 226 extends from centrally located channel 225 through protruding portion 227, such that channel aperture 226 is centrally located within protruding portion 227 and the plurality of teeth 229. In some aspects, protruding portion 227 allows extension deflector 223 to slidably extend and retract with respect to base deflector 221 in a direction extending away from and towards base plate 210 while preventing extension deflector 223 from sliding in a transverse direction.

In some aspects, deflector assembly 210 having the adjustably extendible aspect is also rotatably adjustable with respect to the base plate 210 as discussed above. In such embodiments, base deflector 221 is operably rotatable with respect to base plate 210.

In some aspects, deflector assembly 210 has a textured deflector face as discussed above. In some aspects, base deflector 221, extension deflector 223, or both the base deflector 221 and extension deflector 223 have a textured deflector face. In some aspects, only a portion of base deflector 221 that is not overlayed by extension deflector 223 when extension deflector 223 is in the fully extended position has a textured deflector face. In some aspects, the entire deflector face of base deflector 221 and/or extension deflector 223 comprises a textured face. In some aspects, the textured face comprises a plurality of dimples. In some aspects, the textured face comprises a plurality of hexagonally shaped dimples. In some other aspects, the textured face comprises a plurality of geometrically shaped concave indentations.

The example method 180 of FIG. 7 may also apply to using water flow deflection device 200, according to embodiments of the present disclosure. In some aspects, a user of the water flow deflection device 200 may generally begin by aligning 182 the water flow deflection device 200 on one side of the hull of a watercraft 10. In some aspects, the water flow deflection device 200 may be mounted as near the stern of the watercraft 10 as possible, on a fully submerged flat and smooth surface. In certain aspects, the water flow deflection device 200 has optimal performance when mounted about 3 to about 4 inches below the water line and as near the back of the hull as possible. Once located in the desired vertical and horizontal locations of the watercraft 10, the water flow deflection device 200 is then secured to the hull 184 by operably engaging the suction plates. In certain embodiments, the water flow deflection device 200 is secured to the hull by pressing the device firmly against the hull and locking the suction plate levers into the securing position. The locked position of the suction levers may be achieved when the levers are substantially parallel to the base plate and the hull.

The surface area of the deflector assembly 220 may be slidably adjusted before and/or after water flow deflection device 200 is secured to the hull of watercraft 188. In some aspects, the surface area of deflector assembly 220 is adjusted after water flow deflection device 200 is secured to the hull of watercraft 10. In some other aspects, the surface area of deflector assembly 220 is adjusted before water flow deflection device 200 is secured to the hull of watercraft 10. In either instance, extension deflector 223 may be retraced or extended to the desired position with respect to base deflector 221. In some aspects, the deflector assembly 220 may also be rotationally adjusted prior to or after the water flow deflection device 200 is secured to the hull of watercraft 10. Deflector assembly 220 may also be rotationally adjusted prior to or after the surface area adjustment of deflector assembly 220. After proper surface area and/or rotational adjustments, watercraft 10 may move in a forward direction to generate a wake behind the watercraft, such that a wake surfer may utilize the wake for wake surfing.

Figure 9A:
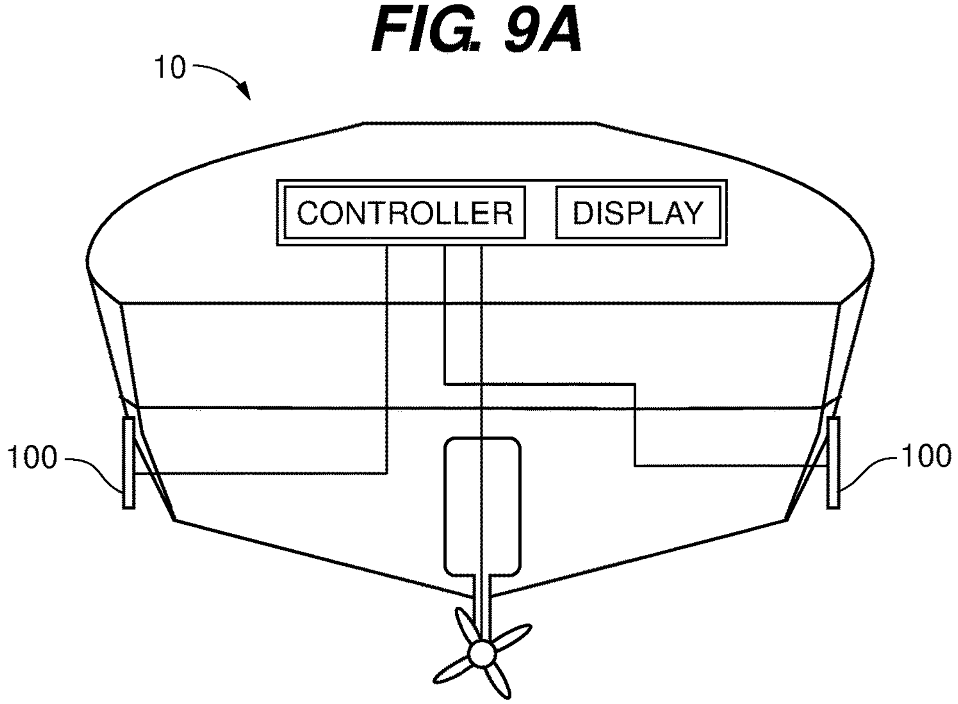
FIG. 9A is a rear perspective view of water flow deflection devices integral with the hull on each side of a watercraft, according to certain embodiments of the present invention.
Figure 9B:
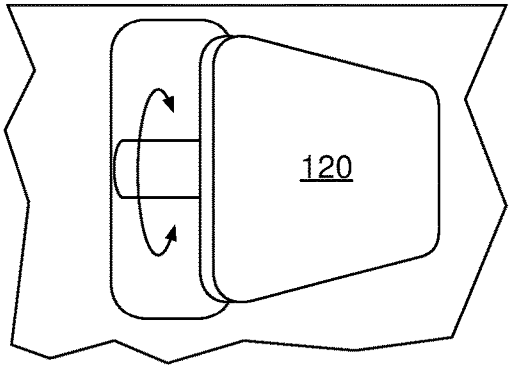
FIG. 9B is a side perspective view of the water flow deflection device of FIG. 9A on the starboard side of the watercraft in an unadjusted position, according to certain embodiments of the present invention.
Figure 9C:
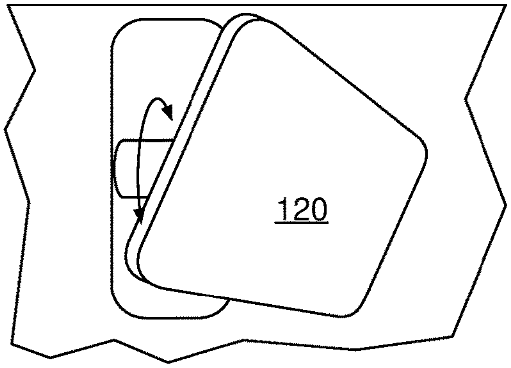
FIG. 9C is a side perspective view of the water flow deflection device of FIGS. 9A-9B on the starboard side of the watercraft in a rotatably adjusted position, according to certain embodiments of the present invention.

In certain other embodiments as illustrated in FIGS. 9A-9C, water flow deflection device 100, 200 may be integral with watercraft 10 and controlled onboard by the watercraft operator utilizing a controller and display. In such instances, the operator of watercraft 10 may control the water flow deflection device 100 onboard with at least one actuator secured on the watercraft and operably connected to the controller. The actuator may be a linear actuator including electric motors, hydraulic motors, pneumatic motors, or the like. Preferably the actuators are watertight or water resistant, and more preferably waterproof. The actuator is configured to push the deflector 120 from an inset of the hull at an inner retracted position and away from the hull to an outer extended position until the deflector 120 reaches a desired oncoming angle to generate a wake. In some aspects, the deflector 120 at the outer extended position is at an angle between about 30° to about 60°, most preferably between about 30° and about 45°. Deflector 120 can also be pivotally mounted to the actuator to allow rotatable adjustment of deflector face with respect to oncoming water. In some aspects, the proximal end of deflector 120 is pivotally mounted to the actuator and distal end of deflector 120 is mounted to a rotatable actuator for adjusting the rotational angle of deflector 120. The operator on watercraft 10 may manually control the rotational angle of deflector 120 using a control panel with display. In some other aspects, deflector interface 112 may further comprise a motor permitting adjustment of the deflector 120. In some other aspects, deflector interface 112 may further comprise a receiver for receiving commands for the operation of the motor. In some other aspects, the deflector orientation may be automatically adjusted in response to a signal indicating the angle of the deflector face with respect to the oncoming water flow. For instance, a gyroscope indicating the orientation of the deflector relative to the water's surface or relative to the location of the water flow deflection device may be utilized to provide real-time signal orientation to the controller. In some aspects, the operator of the watercraft may control the desired deflection device rotational angle and select a manual mode whereby the deflection device is kept at that orientation or automatic mode whereby the deflection device automatically rotationally adjusts while the watercraft is moving. One will appreciate that the rotational actuator may be configured to accommodate a wide variety of rotational angles of the deflector in manual mode as well as maintaining a specific rotational angle or rotational angle range during automatic mode. In some aspects, the rotational angle range may be maintained within about ±10°, in some aspects about ±7.5°, in some aspects about ±5°, and in some aspects about ±3° while the watercraft 10 is in normal operational use.

In another aspect, the wake shaping device may be configured to accommodate hull designs with limited space for attachment. For example, the size of the suction plates, or other means of attachment, may be reduced to permit attachment to a narrower portion of the hull. Embodiments may use an increased number of suction plates to offset the reduced holding power of the smaller suction plates. Such a design may be particularly advantageous for boats with narrower hull lines or stepped hulls.

In another aspect, the wake shaping device may be configured to accommodate hull designs with limited space for attachment. For example, the size of the suction plates, or other means of attachment, may be reduced to permit attachment to a narrower portion of the hull. In some other aspects, an increased number of suction plates may be used to offset the reduced holding power of the smaller suction plates. In some aspects, the size of the base plate may also need to be minimized. Such a design may be particularly advantageous for boats with narrower hull lines or stepped hulls.

Figure 10A:
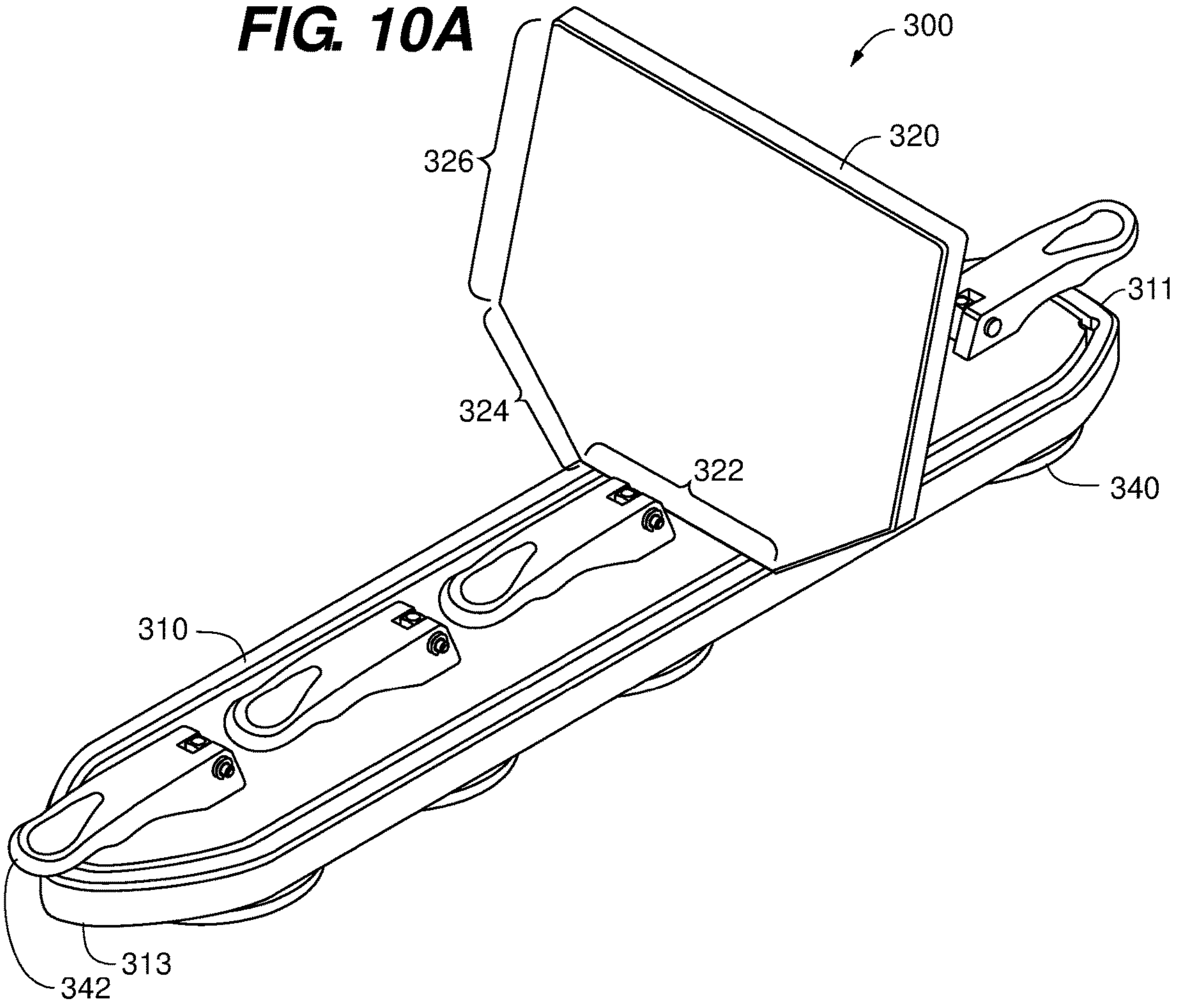
FIG. 10A is a front perspective view of a slim body water flow deflection device, according to certain embodiments of the present invention.
Figure 10B:
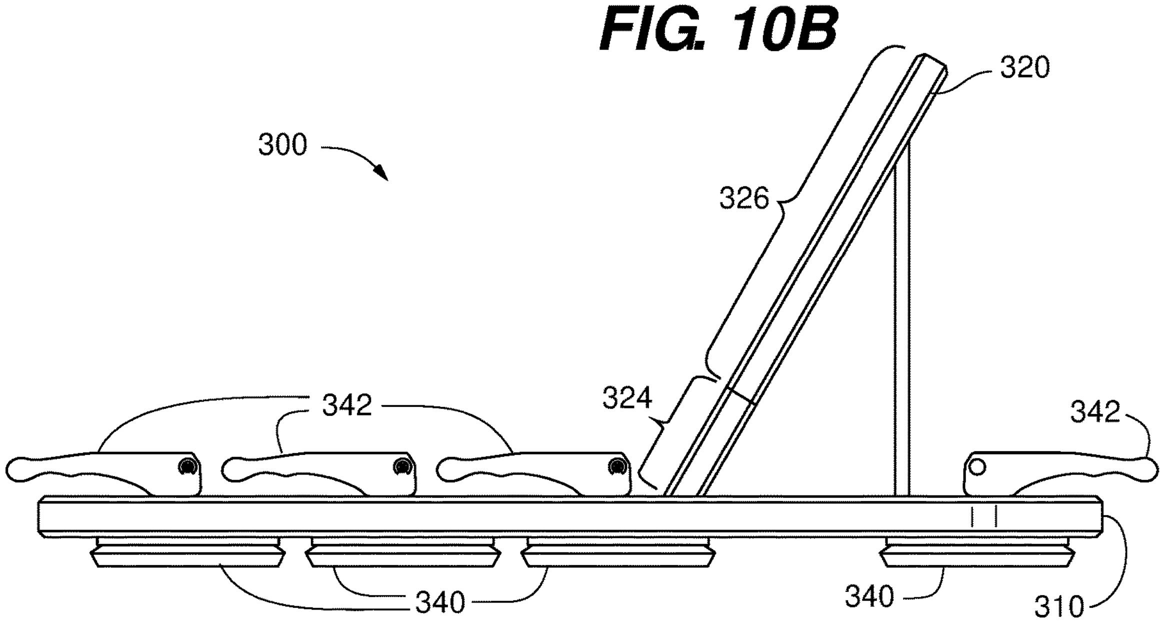
FIG. 10B is a side perspective view of the water flow deflection device of FIG. 10A, according to certain embodiments of the present invention.

Referring now generally to FIG. 10A and FIG. 10B, a water flow deflection device 300 having a slim line configuration is shown according to embodiments of the present disclosure. The slim line configuration device 300 may comprise a base plate 310, a deflector 320 and two or more suction plate assemblies 340, much like the water flow deflection device 100 illustrated in FIGS. 1A-1B.

In some aspects of the slim line configuration device 300, base plate 310 is configured as a narrow rectangle or oblong shape and may generally have deflector 320 oriented rearward of center of the base plate 310, such that a greater portion of the base plate extends toward the stern of the watercraft from the proximate location of the deflector 320 operably attaching to the base plate 310 than toward the bow of the watercraft when the device 300 is mounted to the hull. This slim line configuration places a greater portion of the suction plate assemblies 340 on the base plate in a location to offset the force of the oncoming water against the deflector and ensures base plate 310 remains affixed to the hull. Various embodiments are envisioned, with diverse numbers of suction plate assemblies or other means of attachment, but it may generally be preferable for a greater portion of the attaching means to be focused to the stern-side of the water flow deflecting device 300. Embodiments with a centrally located deflector 320 or the deflector 320 on the stern side of base plate 310 are nonetheless envisioned.

In some aspects, base plate 310 has a proximal end and a distal end, wherein the proximal end is configured to be located towards the bow of the watercraft and the distal end is configured to be located towards the stern of the watercraft when the water flow deflection device 300 is attached to the watercraft. Base plate 310 may include one or more apertures that allow for suction plate assemblies 340 to be secured to base plate 310.

In some preferred aspects, base plate 310 has at least three apertures located between the proximal end and a proximate location of deflector 320 operably engaging with base plate 310, and at least one aperture located between the distal end and the proximate location of deflector 320 operably engaging with base plate 310, wherein such apertures allow at least four suction plate assemblies 340 to be attached to base plate 310.

In some aspects, suction plate assemblies 340 each have diameter of less than 3.5 inches, in some aspects about 3 inches, such that a width of base plate 310 may be as less than about 4.0 inches, in some aspects less than about 3.75 inches, and in some preferred aspects less than about 3.5 inches. In certain aspects where a narrower base plate is required, which requires even smaller sized suction plate assemblies 340, then the water flow deflection device 300 may contain more than four suction plate assemblies 340. In of ordinary skill in the art will appreciate that with the narrower the base plate 310, the smaller and more suction plate assemblies 340 may need to be employed.

Each suction plate of the suction plate assembly 340 may be independently secured with a lock lever 342, though other means of attaching suction plates to base plate 310 are envisioned. Other means of securing slim wake shaping device 300 are also envisioned as well, including but not limited to a unitary lock lever system wherein two or more suction plates may be secured at one time.

In some aspects, deflector 320 has a width generally wider than the width of the base plate. In certain aspects, the width of the deflector may be two to three or more times greater than the width of the base plate, depending on the speed and power of the vessel and the design and shape of the hull. In some aspects, the deflector 320 may have a first width defined by the proximate location of the leading end of deflector 320 operably engaging with base plate 310 with a second width defined by the trailing end of deflector 320, the midway point between trailing and leading ends, or the widest portion of deflector 320.

In some aspects, a ratio of a first deflector width proximate the widest portion of deflector face to a second deflector width proximate the location of engagement with base plate 310 may be at least about 1.25:1, in some aspects at least about 1.5:1, in some aspects at least about 2:1, in some aspects at least about 2.25:1, and in some other aspects at least about 2.5:1. In some aspects, the ratio of the first deflector width to the second deflector width is between about 1.25:1 to about 5:1, in some aspects between about 1.5:1 to about 4:1, and in some aspects between about 2:1 to about 3:1. In an exemplary embodiment, the deflector 320 proximate the engagement with base plate 310 is about 3.5 inches and the deflector 320 proximate the midway point between the leading and trailing ends is about 8 inches. In some aspects, the trailing end is also about 8 inches. In certain preferred aspects, the width of the deflector 320 proximate the midway point and/or the trailing end is greater than the width of the deflector 320 proximate the engagement point with base plate 310.

In some aspects, base plate 310 is between about 10 inches to about 20 inches in length, in some aspects between about 11 inches and about 18 inches, and in some preferred aspects between about 12 inches and about 16 inches.

Deflector 320 may generally have a non-uniform hexagonal shape, with a narrow side to match the width of the base plate 310, two additional narrow sides to allow the deflector 320 angle or flare from the base to the opposing sides of the non-uniform hexagonal shape. In some preferred aspects, deflector 320 has a symmetrical shape. The taper angle between the opposing sides of deflector 320 to the location proximate deflector 320 operably engaging with base plate 310 allows the face of deflector 320 to be substantially wider than the width of base plate 310.

In certain aspects, deflector 320 may have a textured face. For example, the face may have a dimpled textured to optimize its hydrodynamic properties. The dimpled texture may comprise a plurality of depressions in the face of the deflector. The depressions may have a variety of shaped, but may generally be round, producing a roughly spheroid indent in the face of the deflector and having a circular or hexagonal boundary on the surface of the face. The depressions may be uniform or varying in size. Certain preferred embodiments may have a dimple texture where the depressions are substantially one of two dimensions, wherein one set of dimensions is larger than the other, producing a dimpled texture with a mixture of large and small depressions.

Base plate 310 may additionally comprise a deflector interface located between the proximal and distal ends, wherein the deflector interface permits both rotation and secure engagement of deflector 320. Base plate 310 may also have at least one aperture located proximate the center of the deflector interface, wherein such aperture allows deflector 320 to be attached to base plate 310.

Deflector 320 may be affixed to the base plate 310 by being unitarily molded with the base plate, or deflector 320 and base plate 310 may be formed separately and attached, for example in embodiments with a movable deflector. Deflector 320 may be affixed to the base plate such that it extends substantially perpendicular to the hull of the watercraft with the deflection device is attached. Deflector 320 may be arranged so that the face of the deflector forms a substantially right or obtuse angle to the base plate, such that the face of the deflector achieves a desired contact angle with the oncoming water when the watercraft comes up to speed. For example, the angle between the base plate and the face of the deflector may be 90 degrees, 100 degrees, 110 degrees, 120 degrees, etc. The rear side of the deflector, or the non-face side, is at a substantially acute angle relative to the base plate 310, and the angle may be filled in some embodiments, such as with the same marine grade polymer which may be used to form the deflector and base plate, to provide additional support for the deflector 320. The primary support for the deflector 320 is a vertical supporting which rises from the base plate 310 at a right angle and connects to the rear-side of the deflector.

Embodiments may be formed using a variety of sturdy materials, such as wood, metal, or certain plastics, but certain preferred embodiments may be formed using marine grade polymer. Desirable characteristics for materials may include buoyancy, to assist recovery of the device in water.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A water flow deflection device configured to be attached to a side of a watercraft for the enhancement of a watercraft wake, the water flow deflection device comprising:

an elongated base with a first end and a second end, the elongated base configured to be aligned along the side of the watercraft when the water flow deflection device is attached to the watercraft, and the elongated base having a deflector interface;

a deflector assembly operably attached to the base between the first and second ends of the elongated base, the deflector assembly comprising a deflector face spanning between a leading end and an opposing trailing end, the leading end extending in an outward direction away from the elongated base at an acute angle to the opposing trailing end, the deflector face having a surface area configured to deflect water, the leading end being in closer proximity to the watercraft than the trailing end during operational use on the watercraft, and the deflector assembly comprising a base interface; and two or more suction cup assemblies attached to the elongated base, a first suction cup being attached to the elongated base proximately located between the first end and the deflector interface, a second suction cup being attached to the elongated base proximately located between the second end and the deflector interface, and the first and second suction cups configured to provide removable attachment of the elongated base to the watercraft;

wherein the deflector interface and the base interface are operably coupled and configured to allow a rotational adjustment of the deflector face relative to the elongated base.

2. The water flow deflection device of claim 1, wherein the rotational adjustment of the deflector face relative to the elongated base is between about 0° to about 30° in either direction.

3. The water flow deflection device of claim 2, wherein the rotational adjustment of the deflector face relative to the elongated base provides a total range of rotational motion of up to about 60°.

4. The water flow deflection device of claim 1, wherein the rotational adjustment of the deflector face relative to the elongated base is between about 0° to about 22.50° in either direction.

5. The water flow deflection device of claim 4, wherein the rotational adjustment of the deflector face relative to the elongated base provides a total range of rotational motion of up to about 45°.

6. The water flow deflection device of claim 1, further comprising an interface lock that is capable of operably locking the deflector interface and base interface at a desired rotational position of the deflector face relative to the elongated base.

7. The water flow deflection device of claim 1, wherein the deflector interface having a first concentrically-shaped configuration and the base interface having a second concentrically-shaped configuration, such that the first concentrically-shaped configuration of the deflector interface and the second concentrically-shaped configuration of the base interface are configured to be operably coupled and allow the rotational adjustment of the deflector face relative to the elongated base.

8. The water flow deflection device of claim 7, further comprising an interface lock that is capable of operably locking the deflector interface and base interface at a desired rotational position of the deflector face relative to the elongated base.

9. The water flow deflection device of claim 1, wherein the deflector interface having a first plurality of concentrically arranged teeth and the deflector assembly having a base interface having a second plurality of concentrically arranged teeth, and wherein the first plurality of concentrically arranged teeth of the deflector interface and the second plurality of concentrically arranged teeth of the base interface are configured to operably interlock with each other at a desired rotational position of the deflector face relative to the elongated base.

10. The water flow deflective device of claim 1, further comprising one or more rotational alignment guidance indicia proximately located the base interface or the deflector interface.

11. The water flow deflection device of claim 1, wherein the deflector face has a textured surface.

12. The water flow deflection device of claim 11, wherein the textured surface of the deflector face comprises a plurality of concave indentations.

13. The water flow deflection device of claim 1, wherein the deflector assembly comprises a base deflector operably attached to an extendible deflector that is capable of slidably adjusting the surface area of the deflector face of the deflector assembly.

14. The water flow deflection device of claim 13, wherein the extendible deflector overlays at least a portion of the base deflector and is capable of being slidably adjusted relative to the base deflector between a retracted position, fully extended position and one or more intermediate extended positions.

15. A water flow deflection device configured to be attached to a side of a watercraft for the enhancement of a watercraft wake, the water flow deflection device comprising:

an elongated base with a first leading end and a second trailing end, the elongated base configured to be aligned along the side of the watercraft when the water flow deflection device is attached to the watercraft, and the elongated base having a deflector interface;

a deflector assembly comprising a deflector face and a base interface, the base interface operably engaging the deflector interface of the elongated base, the deflector face spanning between a leading end and an opposing trailing end, the leading end extending in an outward angled direction away from the elongated base such that the leading end is closer to the first leading end of the elongated base than the opposing trailing end of the deflector face and the leading end being in closer proximity to the watercraft than the opposing trailing end during operational use on the watercraft; and two or more suction cup assemblies attached to the elongated base, a first suction cup being attached to the elongated base proximately located between the first leading end and the deflector interface, a second suction cup being attached to the elongated base proximately located between the second trailing end and the deflector interface, and the first and second suction cups configured to provide removable attachment of the elongated base to the watercraft;

wherein the deflector interface and the base interface are configured to allow a rotational adjustment of the deflector face relative to the elongated base.

16. The water flow deflection device of claim 15, wherein the rotational adjustment of the deflector face relative to the elongated base is between about 0° to about 30° in at least one direction.

17. The water flow deflection device of claim 15, wherein the rotational adjustment of the deflector face relative to the elongated base is between about 0° to about 30° in either direction, such that the rotational adjustment of the deflector face relative to the elongated base provides a total range of rotational motion of up to about 60°.

18. The water flow deflection device of claim 15, wherein the rotational adjustment of the deflector face relative to the elongated base is between about 0° to about 22.50° in at least one direction.

19. The water flow deflection device of claim 15, wherein the rotational adjustment of the deflector face relative to the elongated base is between about 0° to about 22.50° in either direction, such that the rotational adjustment of the deflector face relative to the elongated base provides a total range of rotational motion of up to about 45°.

20. The water flow deflection device of claim 15, wherein the deflector interface comprises a first concentrically-shaped configuration and the base interface comprises a second concentrically-shaped configuration.

21. The water flow deflection device of claim 20, wherein the deflector interface further comprises a first plurality of concentrically arranged teeth and the base interface further comprises a second plurality of concentrically arranged teeth, and wherein the first plurality of concentrically arranged teeth of the deflector interface and the second plurality of concentrically arranged teeth of the base interface are configured to operably interlock with each other.

22. The water flow deflective device of claim 15, further comprising one or more rotational alignment guidance indicia proximately located the base interface or the deflector interface.

23. The water flow deflection device of claim 22, further comprising an interface lock that is capable of operably locking the deflector interface and base interface at a desired rotational position of the deflector face relative to the elongated base.

24. The water flow deflection device of claim 15, wherein the deflector face has a textured surface.

25. The water flow deflection device of claim 24, wherein the textured surface of the deflector face comprises a plurality of concave indentations.

26. The water flow deflection device of claim 15, wherein the deflector assembly comprises a base deflector operably attached to an extendible deflector that is capable of slidably adjusting the surface area of the deflector face of the deflector assembly.

27. The water flow deflection device of claim 26, wherein the extendible deflector overlays at least a portion of the base deflector and is capable of being slidably adjusted relative to the base deflector between a retracted position, fully extended position and one or more intermediate extended positions.

28. The water flow deflection device of claim 15, further comprising an interface lock that is capable of operably locking the first concentrically-shaped configuration of the deflector interface and the second concentrically-shaped configuration of the base interface at a desired rotational position of the deflector face relative to the elongated base.

29. A water flow deflection device configured to be attached to a side of a watercraft for the enhancement of a watercraft wake, the water flow deflection device comprising:

an elongated configured to be aligned along the side of the watercraft when the water flow deflection device is attached to the watercraft, wherein the elongated base having a deflector interface;

a deflector assembly comprising a deflector and a base interface, the deflector having a deflector face spanning between a leading end and an opposing trailing end, and the base interface operably engaging the deflector interface of the elongated base; and two or more suction cup assemblies attached to the elongated base, a first suction cup being attached to the elongated base proximately located a first leading end of the elongated base, and a second suction cup being attached to the elongated base proximately located a second trailing end of the elongated base, wherein the first and second suction cups configured to provide removable attachment of the elongated base to the watercraft;

wherein the deflector interface and the base interface are configured to allow a rotational adjustment of the deflector face relative to the elongated base.

* * * * *